(12) United States Patent
Featherstone et al.

(10) Patent No.: US 10,518,911 B2
(45) Date of Patent: *Dec. 31, 2019

(54) CONTROL SURFACES FOR USE WITH HIGH SPEED VEHICLES, AND ASSOCIATED SYSTEMS AND METHODS

(71) Applicant: Blue Origin, LLC, Kent, WA (US)

(72) Inventors: Mark Featherstone, Issaquah, WA (US); Frederick W. Boelitz, Sammamish, WA (US); Roger E. Ramsey, Renton, WA (US); David M. Biggs, Kent, WA (US)

(73) Assignee: Blue Origin, LLC, Kent, WA (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/391,782

(22) Filed: Dec. 27, 2016

(65) Prior Publication Data

US 2017/0267380 A1 Sep. 21, 2017

Related U.S. Application Data

(63) Continuation of application No. 14/550,782, filed on Nov. 21, 2014, now Pat. No. 9,580,191, which is a
(Continued)

(51) Int. Cl.
*B64G 1/62* (2006.01)
*B64G 1/24* (2006.01)
(Continued)

(52) U.S. Cl.
CPC .................. *B64G 1/62* (2013.01); *B64C 9/00* (2013.01); *B64G 1/002* (2013.01); *B64G 1/24* (2013.01);
(Continued)

(58) Field of Classification Search
CPC .............. F42B 10/64; B64G 1/14; B64G 1/62
See application file for complete search history.

(56) References Cited

U.S. PATENT DOCUMENTS 2,342,773 A 2/1944 Wellman
2,464,827 A 3/1949 Noyes
(Continued)

FOREIGN PATENT DOCUMENTS

CN 101301931 A 11/2008
DE 10061772 C1 5/2002
(Continued)

OTHER PUBLICATIONS

Persson et al., "Control of the Kistler K-1 First Stage Reorientation Prior to Entry," AIAA Guidance, Navigation and Control Conference, Technical Papers, vol. 2, Aug. 9-11, 1999, 13 pages.
(Continued)

*Primary Examiner* — Brian M O'Hara
(74) *Attorney, Agent, or Firm* — Perkins Coie LLP

(57) ABSTRACT

Vehicles with control surfaces and associated systems and methods are disclosed. In a particular embodiment, a rocket can include a plurality of bidirectional control surfaces positioned toward an aft portion of the rocket. In this embodiment, the bidirectional control surfaces can be operable to control the orientation and/or flight path of the rocket during both ascent, in a nose-first orientation, and descent, in a tail-first orientation for, e.g., a tail-down landing. Launch vehicles with fixed and deployable deceleration surfaces and associated systems and methods are also disclosed.

14 Claims, 13 Drawing Sheets

Related U.S. Application Data continuation of application No. 14/103,742, filed on Dec. 11, 2013, now Pat. No. 8,894,016, which is a continuation of application No. 12/712,083, filed on Feb. 24, 2010, now Pat. No. 8,878,111.

(60) Provisional application No. 61/187,268, filed on Jun. 15, 2009, provisional application No. 61/155,115, filed on Feb. 24, 2009.

(51) Int. Cl.
  *B64G 1/00* (2006.01)
  *B64C 9/00* (2006.01)
  *F42B 10/64* (2006.01)
  *B64G 1/40* (2006.01)
  *B64G 1/60* (2006.01)
  *F42B 15/01* (2006.01)

(52) U.S. Cl.
  CPC ............. *B64G 1/40* (2013.01); *B64G 1/60* (2013.01); *F42B 10/64* (2013.01); *F42B 15/01* (2013.01); *B64G 1/401* (2013.01)

(56) References Cited

U.S. PATENT DOCUMENTS

| | | |
|---|---|---|
| 2,668,026 A | 2/1954 | Price |
| 2,807,429 A | 9/1957 | Hawkins, Jr. et al. |
| 2,824,711 A | 2/1958 | Porter et al. |
| 2,835,199 A | 5/1958 | Stanly |
| 2,837,300 A | 6/1958 | Sullivan |
| 2,846,164 A | 8/1958 | Haberkorn |
| 2,862,680 A | 12/1958 | Berger |
| 2,870,599 A | 1/1959 | Long et al. |
| 2,923,495 A | 2/1960 | Von Zborowski |
| 2,959,376 A | 11/1960 | Saurma |
| 2,971,724 A | 2/1961 | Von Zborowski |
| 2,977,080 A | 3/1961 | Von Zborowski |
| 3,000,593 A | 9/1961 | Eggers et al. |
| 3,065,937 A | 11/1962 | Vigil |
| 3,093,346 A | 6/1963 | Faget et al. |
| 3,098,445 A * | 7/1963 | Jackson ............... F42B 8/24 102/348 |
| 3,118,636 A | 1/1964 | Kantrowitz et al. |
| 3,125,313 A | 3/1964 | Soderberg |
| 3,176,464 A | 4/1965 | Meyer et al. |
| 3,188,957 A | 6/1965 | Petre |
| 3,191,566 A | 6/1965 | Wilken et al. |
| 3,198,459 A | 8/1965 | Geary |
| 3,210,025 A | 10/1965 | Lubben |
| 3,215,372 A | 11/1965 | Price |
| 3,231,219 A | 1/1966 | Young |
| 3,252,673 A | 5/1966 | Reichert |
| 3,279,188 A | 10/1966 | Price |
| 3,285,175 A | 11/1966 | Keenan |
| 3,286,951 A | 11/1966 | Kendall |
| 3,295,790 A | 1/1967 | Bono et al. |
| 3,302,908 A | 2/1967 | Michel |
| 3,350,887 A | 11/1967 | Leunig et al. |
| 3,403,873 A | 10/1968 | Bell et al. |
| 3,508,724 A | 4/1970 | Scher et al. |
| 3,534,686 A | 10/1970 | Watson |
| 3,603,533 A | 9/1971 | Stripling |
| 3,606,212 A | 9/1971 | Bradley |
| 3,711,040 A * | 1/1973 | Carver ............... F42B 10/64 244/3.21 |
| 3,768,255 A | 10/1973 | Barnes, Jr. et al. |
| 3,806,064 A | 4/1974 | Parilla |
| 3,903,801 A | 9/1975 | Senoski |
| 3,966,142 A | 6/1976 | Corbett et al. |
| 4,500,052 A | 2/1985 | Kim |
| 4,700,912 A | 10/1987 | Corbett |
| 4,795,113 A | 1/1989 | Minovitch |
| 4,796,839 A | 1/1989 | Davis |
| 4,804,155 A | 2/1989 | Strumbos |
| 4,832,288 A | 5/1989 | Kendall et al. |
| 4,834,324 A | 5/1989 | Criswell |
| 4,896,847 A | 1/1990 | Gertsch |
| 4,964,340 A | 10/1990 | Daniels et al. |
| 5,080,306 A | 1/1992 | Porter et al. |
| 5,086,993 A | 2/1992 | Wainfan |
| 5,094,409 A | 3/1992 | King et al. |
| 5,295,643 A | 3/1994 | Ebbert et al. |
| 5,318,255 A | 6/1994 | Facciano et al. |
| 5,318,256 A | 6/1994 | Appleberry |
| 5,398,635 A | 3/1995 | Tellington |
| 5,417,393 A | 5/1995 | Klestadt |
| 5,526,999 A | 6/1996 | Meston |
| 5,568,901 A * | 10/1996 | Stiennon ............... B64G 1/002 244/171.3 |
| 5,595,358 A | 1/1997 | Demidov et al. |
| 5,667,167 A | 9/1997 | Kistler |
| 5,678,784 A | 10/1997 | Marshall, Jr. et al. |
| 5,743,492 A | 4/1998 | Chan et al. |
| 5,842,665 A | 12/1998 | McKinney et al. |
| 5,871,173 A | 2/1999 | Frank et al. |
| 5,873,549 A * | 2/1999 | Lane ............... B64G 1/24 102/384 |
| 5,927,653 A | 7/1999 | Mueller et al. |
| 5,932,830 A | 8/1999 | Kristensen et al. |
| 6,024,006 A | 2/2000 | Kindem et al. |
| 6,076,771 A | 6/2000 | Bailey et al. |
| 6,158,693 A | 12/2000 | Mueller et al. |
| 6,176,451 B1 | 1/2001 | Drymon |
| 6,193,187 B1 | 2/2001 | Scott et al. |
| 6,247,666 B1 | 6/2001 | Baker et al. |
| 6,360,994 B2 | 3/2002 | Hart et al. |
| 6,364,252 B1 | 4/2002 | Anderman |
| 6,398,166 B1 | 6/2002 | Ballard et al. |
| 6,450,452 B1 | 9/2002 | Spencer et al. |
| 6,454,216 B1 | 9/2002 | Kiselev et al. |
| 6,502,787 B1 | 1/2003 | Barrett |
| 6,557,803 B2 | 5/2003 | Carpenter et al. |
| 6,616,092 B1 | 9/2003 | Barnes |
| 6,651,578 B1 | 11/2003 | Gorman |
| 6,666,402 B2 | 12/2003 | Rupert et al. |
| 6,666,409 B2 | 12/2003 | Carpenter et al. |
| 6,698,685 B2 | 3/2004 | Walmsley |
| 6,817,580 B2 | 11/2004 | Smith |
| 6,926,576 B1 * | 8/2005 | Alway ............... A63H 27/005 446/34 |
| 6,929,576 B2 | 8/2005 | Armstrong et al. |
| 6,932,302 B2 | 8/2005 | Martin |
| 7,152,547 B1 | 12/2006 | Hovland |
| 7,226,017 B2 | 6/2007 | Blevio, Sr. |
| 7,287,722 B2 | 10/2007 | Diamandis et al. |
| 7,344,111 B2 | 3/2008 | Janeke |
| 8,047,472 B1 | 11/2011 | Brand et al. |
| 8,408,443 B2 | 4/2013 | Miryekta et al. |
| 8,408,497 B2 | 4/2013 | Boelitz et al. |
| 8,424,808 B2 | 4/2013 | Boelitz |
| 8,729,442 B2 | 5/2014 | Boelitz |
| 8,733,706 B1 | 5/2014 | Fernandez et al. |
| 8,878,111 B2 | 11/2014 | Featherstone |
| 8,894,016 B2 | 11/2014 | Featherstone |
| 8,991,767 B2 | 3/2015 | Featherstone |
| 9,487,308 B2 | 11/2016 | Featherstone et al. |
| 9,580,191 B2 | 2/2017 | Featherstone |
| 2002/0096041 A1 | 7/2002 | Briggs et al. |
| 2002/0179776 A1 | 12/2002 | Mueller et al. |
| 2003/0042367 A1 | 3/2003 | Carpenter et al. |
| 2003/0192984 A1 | 10/2003 | Smith |
| 2004/0124312 A1 | 7/2004 | Mueller et al. |
| 2005/0072876 A1 | 4/2005 | Ducasse |
| 2006/0006289 A1 | 1/2006 | Janeke |
| 2006/0038061 A1 | 2/2006 | Blevio |
| 2006/0049316 A1 | 3/2006 | Antonenko et al. |
| 2006/0113425 A1 | 6/2006 | Rader |
| 2007/0012820 A1 | 1/2007 | Buehler |
| 2007/0120019 A1 | 5/2007 | August |
| 2008/0078884 A1 | 4/2008 | Trabandt et al. |
| 2008/0217481 A1 | 9/2008 | Janeke |
| 2009/0108137 A1 | 4/2009 | Simon et al. |

(56) References Cited

U.S. PATENT DOCUMENTS

| | | |
|---|---|---|
| 2009/0205311 A1 | 8/2009 | Bulman et al. |
| 2009/0206204 A1 | 8/2009 | Rosen |
| 2010/0012776 A1 | 1/2010 | Hursig |
| 2010/0051751 A1 | 3/2010 | Mueller et al. |
| 2010/0170981 A1 | 7/2010 | Belleville |
| 2010/0320329 A1 | 12/2010 | Boelitz et al. |
| 2011/0017872 A1 | 1/2011 | Bezos et al. |
| 2011/0024558 A1 | 2/2011 | Blevio, Sr. |
| 2011/0097995 A1 | 4/2011 | Caplin et al. |
| 2011/0114792 A1 | 5/2011 | Im |
| 2011/0127382 A1 | 6/2011 | Im |
| 2014/0042267 A1 | 2/2014 | Featherstone |
| 2014/0263841 A1 | 9/2014 | Featherstone et al. |
| 2014/0360157 A1 | 12/2014 | Barker |
| 2015/0034770 A1 | 2/2015 | Vandervort |
| 2016/0023782 A1 | 1/2016 | Featherstone |
| 2016/0311556 A1 | 10/2016 | Knudsen |
| 2017/0267380 A1 | 9/2017 | Featherstone et al. |

FOREIGN PATENT DOCUMENTS

| | | |
|---|---|---|
| DE | 10058339 A1 | 6/2002 |
| EP | 0622604 A2 | 11/1994 |
| EP | 1340316 A1 | 9/2003 |
| GB | 1522018 A | 8/1978 |
| JP | 07172397 | 7/1995 |
| JP | H0811800 | 1/1996 |
| JP | 10505560 | 6/1998 |
| JP | 2000508601 A | 7/2000 |
| JP | 2001501151 A | 1/2001 |
| JP | 3239698 B2 | 12/2001 |
| JP | 2002535193 A | 10/2002 |
| RU | 2053168 C1 | 1/1996 |
| RU | 2088787 | 1/1996 |
| RU | 2104898 | 2/1998 |
| RU | 2192992 | 11/2002 |
| RU | 2221214 | 10/2004 |
| SU | 1837038 | 8/1993 |
| UA | 19433 U | 12/2006 |
| WO | WO-9604168 | 2/1996 |
| WO | WO-9738903 | 10/1997 |
| WO | WO-9813260 | 4/1998 |
| WO | WO-2009032585 A1 | 3/2009 |
| WO | WO-2009094603 | 7/2009 |
| WO | WO-2010099228 A1 | 9/2010 |
| WO | WO-2010141111 A2 | 12/2010 |
| WO | WO-2010141124 A1 | 12/2010 |
| WO | WO-2016137877 | 9/2016 |

OTHER PUBLICATIONS

GeekTimes, "Integrated Soluation for Capturing and Retaining the Return Stages of Space Vehicles, (non-official translation)" https://geektimes.ru/post/273208, Mar. 23, 2016, 4 pages.

"A Collection of the 13th AIAA/CIRA international space planes and hypersonic systems and technologies conference: a ; collection of technical papers," American Institute of ; Aeronautics and Astronautics, vol. 2, 2005, pp. 830-832.

"DC-X Successfully Completes Sixth Test Flight,"; http://www.thefreelibrary.com/DC-X+SUCCESSFULLY+COMPLETES+SIXTH+TEST+FLIGHT-a016839331, accessed: Oct. 15, 2014, 1 page.

"Delta Clipper Demonstrates Re-Entry Maneuver," http://www.thefreelibrary.com/DELTA+CLIPPER+DEMONSTRATES+RE-ENTRY+MANEUVER-a017203138, ; accessed: Oct. 15, 2014, 1 page.

"Solid Rocket Boosters and Post Launch ; Processing," NASA Facts, National Aeronautics and Space Administration, John F. Kennedy Space Center, 2006, 8 pages.

Aerospace America, "The 787 and the ; A350 Teasing out the Facts," Publication of the American Institute of Aeronautics and Astronautics, Jun. 2009, 3 pages.

Blum et al., "Dual Liquid Flyback Booster for the Space Shuttle," Lockheed Martin Michoud Space Systems, New Orleans, Lousiana, Jul. 1998, 11 pages.

Butrica, Andrew J., "Single stage to orbit: politics, space ; technology, and the quest for reusable rocketry," The Johns Hopkins University Press, 2003, 178-182.

Cohan et al., "Space transportation systems: 1980-2000," American Institute of Aeronautics and Astronautics, 1978, ; pp. 37-47.

Declaration of Marshal H. Kaplan, Ph.D. in Support of the Petition of Inter Partes Review of U.S. Pat. No. of 8,678,321 dated Aug. 25, 24, 142 pages.

Gaubatz et al., "DC-X Results and the Next Step," AIAA Space Programs and Technologies Conference and Exhibit, Sep. 27-29, 1994, 15 pages.

Gifford, James M., "The Ride," Satellite Communications, ProQuest Science Journal, Jun. 1998, 4 pages.

Gunston, Bill, "The Cambridge Aerospace Dictionary—Second Edition," Cambridge University Press, 2009, 6 pages.

Hare, John "VTVLs as RTLS Boosters," Selenian Boondocks, http://selenianboondocks.com/2010/06/vtvls-as-rtls-boosters/, accessed Jun. 30, 2010, 6 pgs.

International Search Report and Written Opinion, International Application No. PCT/US2010/025270, Applicant: Blue Origin, LLC., dated Apr. 12, 2010, 12 pages.

Ishijima et al., "Re-entry and Terminal Guidance for Vertical-Landing TSTO (Two-Stage to Orbit)," A Collection of Technical Papers Part 1, AIAA Guidance, Navigation and Control Conference and Exhibit, Aug. 10-12, 1998, 9 pages.

Kaplan H. Marshall, "Space Shuttle: America's Wing to the Future," 1978, 28 pages.

Keith et al., "Propulsion System Advances that Enable a Refusable Liquid Fly Back Booster (LFBB)" Boeing Reusable Space Systems, Downey California, Jul. 1998, 8 pages.

M. Avilov. "Types Rockets Models (design and flight)," M.: Publishing house "DOSAAF", 1968. 2 pages.

McDonnell Douglas Aerospace, "Delta Clipper Test Program Off to Flying Start," http://www.hq.nasa.gov/pao/History/x-33/dcxtests.html, accessed: Oct. 15, 2014, 5 pages.

Memi, E., "A Step to the Moon: DC-X Experimental Lander ; Set Up Boeing for Future NASA Work," Boeing Frontiers, http://www.boeing.com/news/frontiers/archive/2008/aug/i_history.pdf, accessed Aug. 2008, 2 pages.

NASA, "Space Shuttle Program: Spanning 30 years of Discovery," http://www.nasa.gov/mission_pages/shuttle, accessed Aug. 13, 2014, 2 pages.

Pavlushenko et al., "Unmanned Aerial Vehicles History, Use, Distribution, Threats and Prospects of Development," National and Global Security: academic notes of the PIR-center. 2004. No. 2(26), 5 pages.

Rogers, Lucy, "It's ONLY Rocket Science: An Introduction in Plain English," Springer Science and Business Media, 2008, 23 pages.

Steven J. Isakowitz, Joseph P. Hopkins, Joshua B. Hopkins, "International Reference Guide to Space Launch Systems," AIAA 4th Edition, 2004, 25 pages.

Stiennon et al., "The rocket company," American Institute of Aeronautics and Astronautics, 2005, pp. 159-161.

Vadus, Joseph R., Kondo, Takeo, "A Floating Offshore Satellite Launching Facility," Marine Technology Society, Marine Technology Society Journal, 1997/1998, 7 pages.

Waters et al., "Test Results of an F/A-18 Automatic Carrier Landing Using Shipboard Relatives GPS," ION 57th Biennial Guidance Test Symposium, Jun. 11-13, 2001, 11 pages.

Boelitz et al., "Kistler Launch Assist Platform Return to Burn Control," American Institute of Aeronautics and Astronautics, Proceedings of AIAA Guidance, Navigation, and Control Conference and Exhibit, Aug. 9-11, 1999, 11 pages.

Hattis et al., "Overview of the Kistler K1 Guidance and Control System," American Institute of Aeronautics and Astronautics, Proceedings of AIAA Guidance, Navigation, and Control Conference and Exhibit, Aug. 9-11, 1999, 17 pages.

(56) References Cited

OTHER PUBLICATIONS

Berger et al., "AD-A265 940 Environmental Assessment DTIC R Single Stage SELECTE Rocket Technology DC-X Test Program," https://apps.dtic.mil/dtic/tr/fulltext/u2/a265940, Jun. 1, 1992, 148 pages.

* cited by examiner

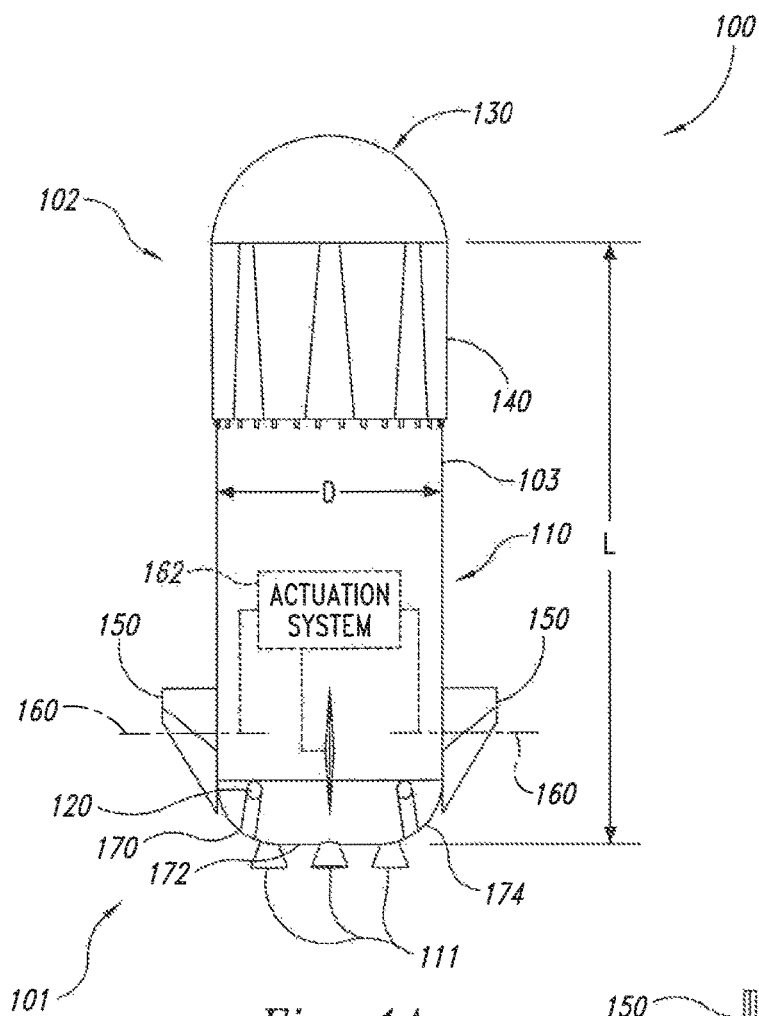
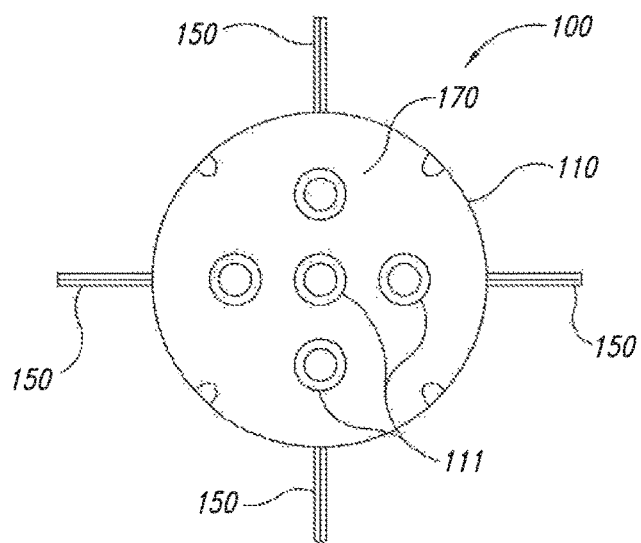

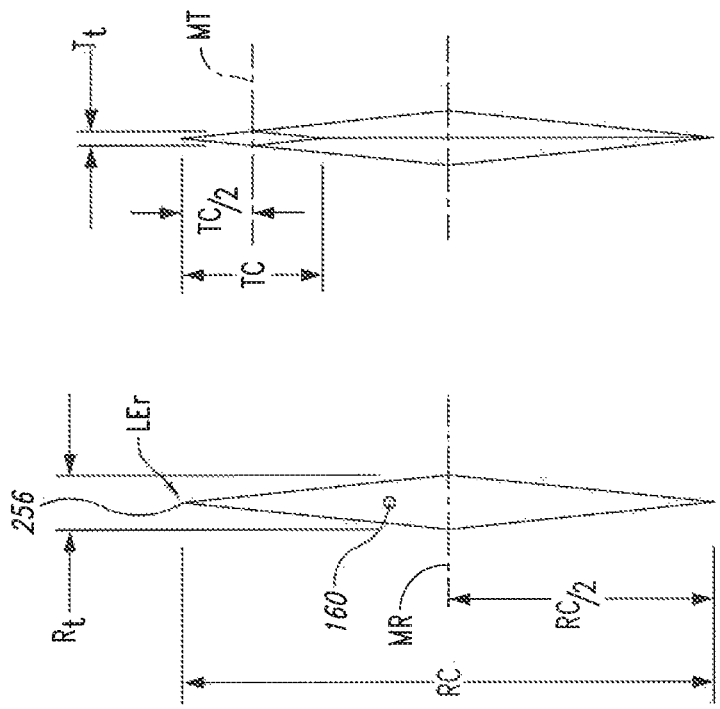
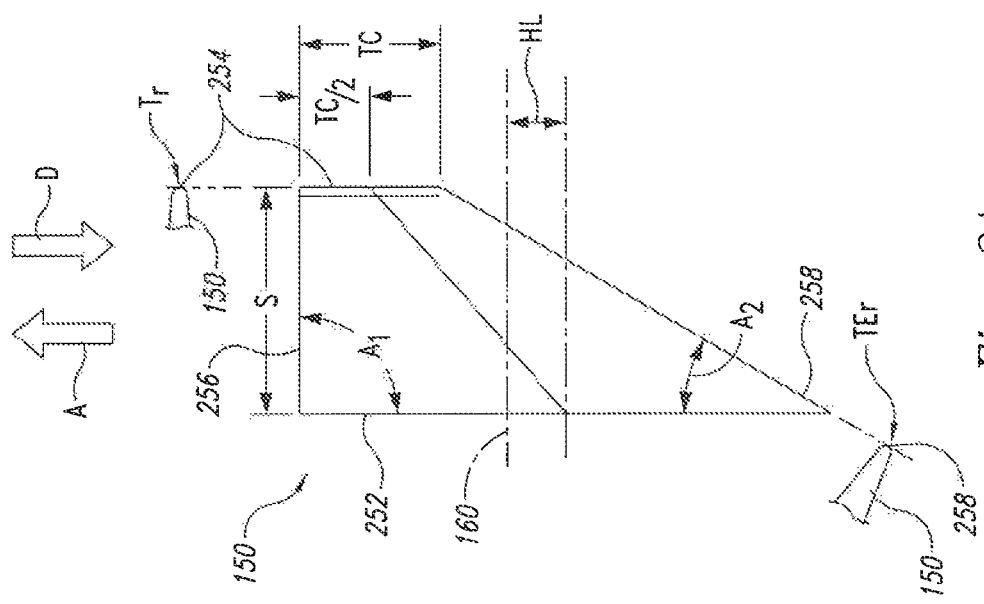
Fig. 2C
Fig. 2B
Fig. 2A

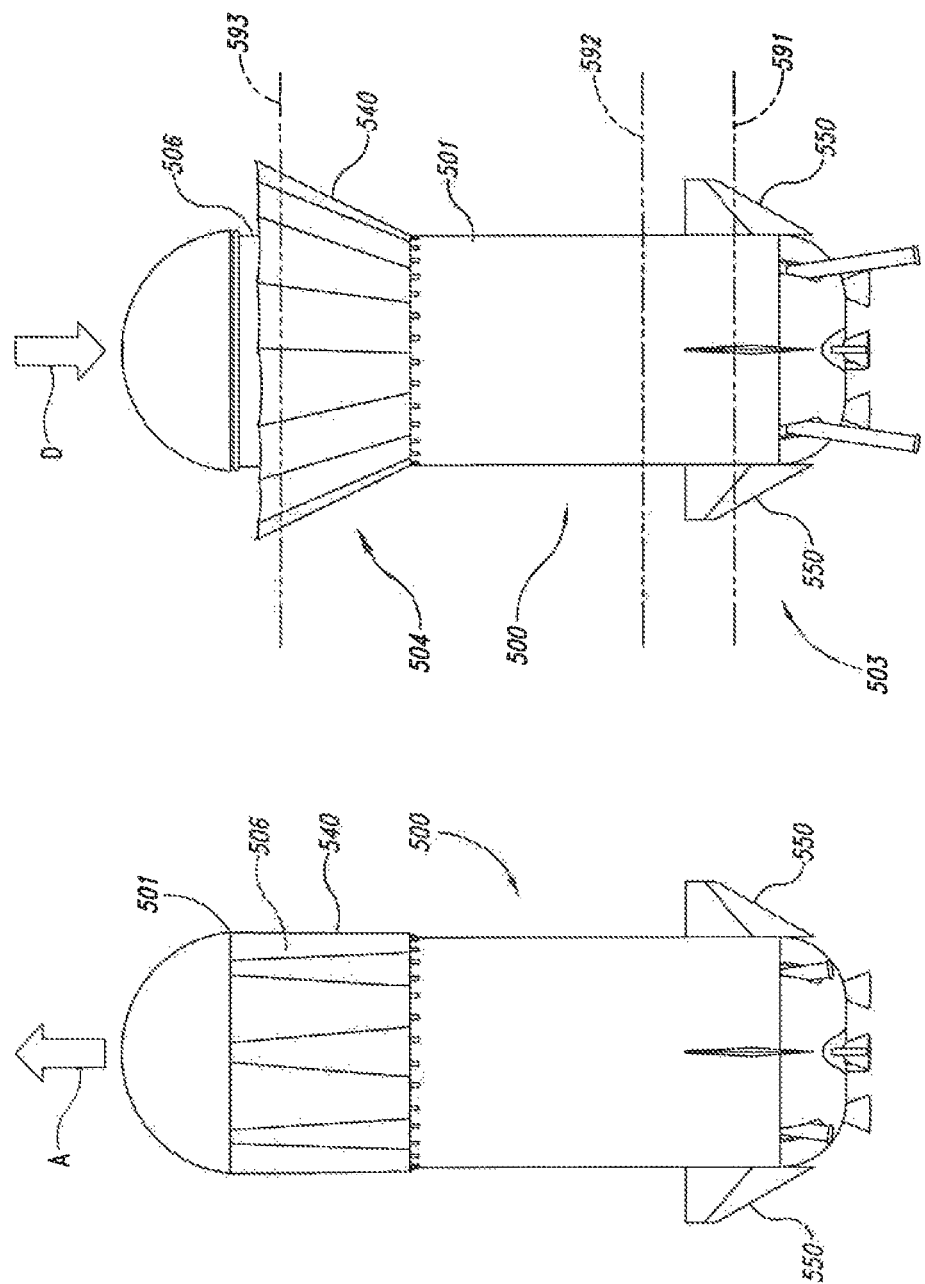

CONTROL SURFACES FOR USE WITH HIGH SPEED VEHICLES, AND ASSOCIATED SYSTEMS AND METHODS

CROSS-REFERENCE TO RELATED APPLICATION(S) INCORPORATED BY REFERENCE

The present application is a continuation of U.S. patent application Ser. No. 14/550,782, now U.S. Pat. No. 9,580,191, filed Nov. 21, 2014, and entitled BIDIRECTIONAL CONTROL SURFACES FOR USE WITH HIGH SPEED VEHICLES, AND ASSOCIATED SYSTEMS AND METHODS, which is a continuation of U.S. patent application Ser. No. 14/103,742, now U.S. Pat. No. 8,894,016, filed Dec. 11, 2013, and entitled BIDIRECTIONAL CONTROL SURFACES FOR USE WITH HIGH SPEED VEHICLES, AND ASSOCIATED SYSTEMS AND METHODS, which is a continuation of U.S. patent application Ser. No. 12/712,083, now U.S. Pat. No. 8,878,111, filed Feb. 24, 2010, and entitled BIDIRECTIONAL CONTROL SURFACES FOR USE WITH HIGH SPEED VEHICLES, AND ASSOCIATED SYSTEMS AND METHODS, which claims priority to U.S. Provisional Patent Application No. 61/187,268, filed Jun. 15, 2009, and entitled "BIDIRECTIONAL CONTROL SURFACES FOR USE WITH HIGH SPEED VEHICLES, AND ASSOCIATED SYSTEMS AND METHODS," and which also claims priority to U.S. Provisional Patent Application No. 61/155,115, filed Feb. 24, 2009, and entitled "ROCKETS WITH DEPLOYABLE FLARE SURFACES, AND ASSOCIATED SYSTEMS AND METHODS," which are incorporated herein by reference in their entireties.

TECHNICAL FIELD

The present disclosure is directed generally to control surfaces for use with high speed vehicles, and associated systems and methods. It is also directed generally to launch vehicles with fixed and deployable deceleration surfaces, including flare surfaces, and associated systems and methods.

BACKGROUND

Rocket powered launch vehicles have been used for many years to carry humans and other payloads into space. Rockets delivered the first humans to the moon, and have launched many satellites into earth orbit, unmanned space probes, and supplies and personnel to the orbiting international space station.

Despite the rapid advances in manned and unmanned space flight, delivering astronauts, satellites, and other payloads to space continues to be an expensive proposition. One reason for this is that most conventional launch vehicles are only used once, and hence are referred to as "expendable launch vehicles" or "ELVs." The advantages of reusable launch vehicles (RLVs) include the potential of providing low cost access to space.

Although NASA's space shuttle is largely reusable, reconditioning the reusable components is a costly and time consuming process that requires extensive ground based infrastructure. Moreover, the additional shuttle systems required for reentry and landing reduce the payload capability of the shuttle. As commercial pressures increase, the need remains for lower-cost access to space. Aspects of the present disclosure are directed to addressing this challenge.

BRIEF DESCRIPTION OF THE DRAWINGS

FIG. 1A is a side elevation view of a representative vehicle having bidirectional control surfaces configured in accordance with an embodiment of the disclosure, and FIG. 1B is an aft end view of the vehicle of FIG. 1A.

FIGS. 2A-2C are a plan view, inboard end view, and an outboard end view, respectively, of a bidirectional control surface configured in accordance with an embodiment of the disclosure.

FIGS. 6A and 6B illustrate a representative vehicle during ascent and descent, respectively, in accordance with an embodiment of the disclosure.

DETAILED DESCRIPTION

Figure 3A:
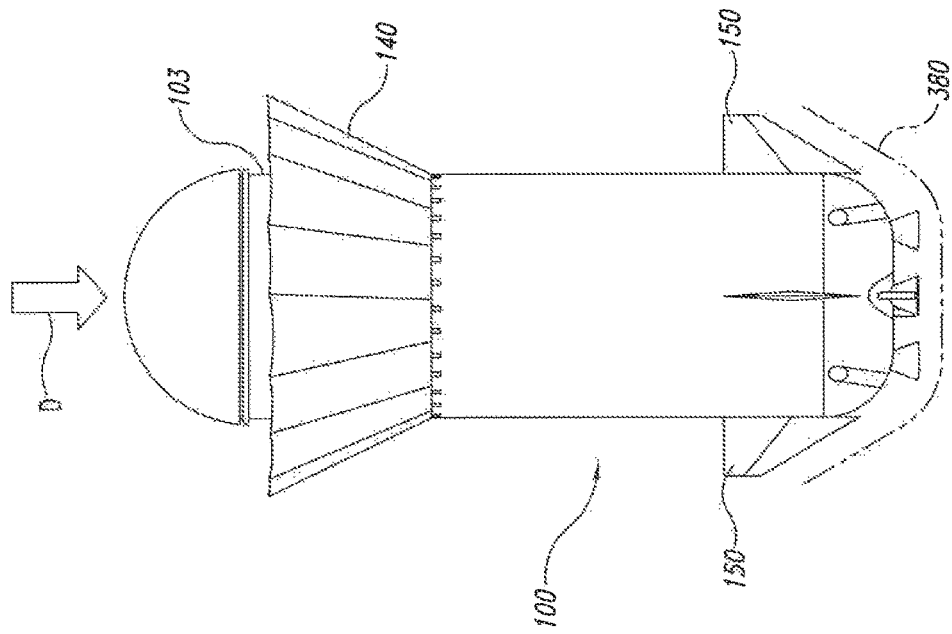
FIGS. 3A and 3B illustrate a representative vehicle during ascent and descent, respectively, in accordance with an embodiment of the disclosure.

The present disclosure is directed generally to bidirectional control surfaces for use with rockets and other vehicles that can fly in both nose-first and tail-first orientations. Several details describing structures and processes that are well-known and often associated with rockets and aerodynamic control surfaces are not set forth in the following description to avoid unnecessarily obscuring embodiments of the disclosure. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1A-4D.

The present disclosure is also directed generally to launch vehicles (e.g., rockets) with fixed and deployable deceleration surfaces, and associated systems and methods. Several details describing structures and processes that are well-known and often associated with rocket flow surfaces are not set forth in the following description for purposes of brevity. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 5A-14.

FIG. 1A is a partially schematic, side elevation view of a vehicle 100 having a plurality of bidirectional fins 150 configured in accordance with an embodiment of the disclosure. FIG. 1B is an aft end view of the vehicle 100 shown in FIG. 1A. Referring to FIGS. 1A and 1B together, the vehicle 100 can be a rocket (e.g., an orbital or suborbital vehicle) that includes a booster or propulsion module 110 carrying a payload module 130. In one embodiment, for example, the vehicle 100 can be a reusable launch vehicle that takes advantage of the ability to fly in both a nose first and tail first direction to recover the vehicle 100 in a vertical, tail first landing. In a particular embodiment, the payload module 130 can be configured to carry cargo and/or crew. In the illustrated embodiment, the payload module 130 has a hemispherical shape. In other embodiments, however, the payload module 130 can have other shapes. In still further embodiments, the propulsion module 110 can be configured to carry additional rocket stages, such as an upper stage.

The propulsion module 110 can include one or more engines having corresponding exhaust nozzles 111 positioned toward an aft portion 101 of the vehicle 100. In a particular embodiment, the vehicle 100 includes five engines, each having a corresponding engine exhaust nozzle 111. The engines are used during the boost phase to propel the vehicle 100 upwardly during ascent. Optionally, some or all of the engine nozzles 111 can pivot to provide thrust vectoring to steer the vehicle 100 during ascent, either alone or in combination with other control systems including other aerodynamic control systems.

The vehicle 100 can additionally include a deployable aerodynamic surface or surfaces, such as a deployable flare 140, positioned toward a forward portion 102 of the vehicle 100. The deployable flare 140 can be stowed during ascent and deployed during descent to stabilize and/or slow the vehicle 100 during a tail down descent and landing. In various embodiments, the vehicle 100 can include deployable flare systems as described in U.S. Provisional Patent Application No. 61/155,115, filed Feb. 24, 2009, and entitled "ROCKETS WITH DEPLOYABLE FLARE SURFACES, AND ASSOCIATED SYSTEMS AND METHODS;" and U.S. Non-provisional patent application Ser. No. 12/712,156, now U.S. Pat. No. 8,408,497, filed Feb. 24, 2010, and entitled "LAUNCH VEHICLES WITH FIXED AND DEPLOYABLE DECELERATION SURFACES, AND/OR SHAPED FUEL TANKS, AND ASSOCIATED SYSTEMS AND METHODS," both of which are incorporated herein in their entireties by reference. In the illustrated embodiment, the vehicle 100 can further include a deployable landing gear 120 (showed stowed in FIGS. 1A and 1B) positioned to allow the vehicle 100 to land in a tail first or tail down orientation.

Although only illustrative of particular embodiments, the propulsion module 110 can have a length L of from about 10 feet to about 50 feet, such as from about 20 feet to about 40 feet, or about 33 feet. The propulsion module 110 can also include a cylindrical or circular cross-section having a diameter D of from about five feet to about 20 feet, or from about eight feet to about 15 feet, or about 13 feet. In other embodiments, the vehicle 100 can have other shapes, sizes and overall dimensions without departing from the present disclosure.

In a particular embodiment, the aft portion 101 of the vehicle 100 includes an aft surface 170. In the illustrated embodiment, the aft surface 170 includes a base region 172 in the proximity of the nozzles 111, and a transition region 174. The transition region 174 transitions between the base region 172 and an exterior surface 103 of the propulsion module 110. In a particular embodiment, the base region 172 can be flat, or at least generally flat, and the transition region 174 can be curved. For example, in a particular embodiment the transition region 174 can have a radius of from about 20 inches to about 50 inches, or about 40 inches. In other embodiments, the base region 172 and/or the transition region 174 can have other shapes, sizes, and/or dimensions.

In one aspect of this embodiment, the bidirectional fins 150 are positioned toward the aft portion 101 of the propulsion module 110. In the illustrated embodiment, the vehicle 100 includes four fins 150 equally spaced around the propulsion module 110, and each of the fins 150 is substantially identical, or at least generally similar in structure and function. In other embodiments, however, the vehicle 100 can include more or fewer fins positioned at different locations around the propulsion module 110, and one or more of the fins can be different in structure and/or function.

As described in greater detail below, the bidirectional fins 150 can be used for vehicle guidance and control during both ascent in a nose-first direction or orientation, and descent in a tail-first direction. In this regard, the fins 150 can be operationally coupled to a control system 162. The control system 162 can include one or more processors, circuits, and/or mechanisms configured to rotate or pivot the fins back and forth about a pivot axis or hinge line 160 in response to control signals received from an on-board guidance system, a remote guidance system, and/or computer-readable media. As described in greater detail below, the bidirectional fins 150 can pivot together in the same direction, at the same rate, and/or to the same angle of attack ("a"); or independently (e.g., differentially) with respect to each other in different directions, rates, and/or different angles of attack, as required to provide the desired vehicle trajectory during ascent and/or descent. In a particular embodiment, the fins 150 can operate between angles of +/−30 degrees. In other embodiments, the fins 150 can pivot to other angles. Further aspects of the fins 150 are described in greater detail below.

FIG. 2A is a planform or side elevation view of the fin 150 configured in accordance with an embodiment of the disclosure. FIG. 2B is an inboard end view of the fin 150, and FIG. 2C is an outboard end view of the fin 150. Referring to FIGS. 2A-2C together, the fin 150 includes a tip 254 spaced apart from a root 252. In one aspect of this embodiment, the fin 150 has a relatively low aspect ratio ("AR"). For example, the fin 150 can have a span S of from about 15 inches to about 45 inches, or about 30 inches. The root 252 can have a root chord RC of from about 60 inches to about 110 inches, or about 83 inches, and the tip 254 can have a tip chord TC of from about 10 inches to about 30 inches, or about 20 inches. As those of ordinary skill in the art will appreciate, the foregoing dimensions are merely representative of certain embodiments of the disclosure. The present disclosure is not limited to these dimensions, and other embodiments can have other dimensions without departing from the present disclosure.

In another aspect of this embodiment, the fin 150 includes a first or forward edge 256 having relatively little sweep, or no sweep, as defined by a first sweep angle A1 of from about 85 degrees to about 95 degrees, or about 90 degrees. The fin 150 can further include a second or aft edge 258 having a relatively high sweep as defined by a second sweep angle A2 of from about 15 degrees to about 40 degrees, or about 29 degrees. In other embodiments, the forward edge 256 and/or the aft edge 258 can have other sweep angles. As used herein, in this particular embodiment the term "forward edge" refers to the edge positioned toward the forward portion 102 of the vehicle, and the term "aft edge" refers to the edge positioned toward the aft portion 101 of the vehicle.

In a particular embodiment, the fin 150 has a symmetrical, or an at least approximately symmetrical airfoil cross-section. More specifically, in the illustrated embodiment the fin 150 has a flat-sided, diamond-shaped cross-section in which the root 252 has a maximum thickness Rt occurring at, or at least proximate to, a midpoint MR of the root chord RC. Similarly, the tip 254 has a maximum thickness Tt occurring at, or at least proximate to, the midpoint MT of the tip chord TC. In a particular embodiment, the maximum thickness Rt at the root chord RC can be from about 6 inches to about 13 inches, or about 9 inches, and the maximum thickness Tt at the tip chord TC can be from about 1 inch to about 4 inches, or about 2.2 inches. In other embodiments, the fin 150 can have other symmetric or non-symmetric cross-sections, as well as other maximum chord thicknesses at the root and/or the tip.

As shown in FIG. 2A, the hinge line 160 is positioned between the midpoint MR of the root 252 and the forward edge 256, and is offset from the midpoint a distance HL. In the illustrated embodiment, the distance HL can be from about 3 inches to about 18 inches, or about 8 inches. In other embodiments, the hinge line 160 can have other positions relative to the forward edge 256, the aft edge 258, and/or the midpoint MR of the root 252.

In a further aspect of this embodiment, the forward edge 256 can have a radius LEr of from about 0.1 inch to about 1 inch, or about 0.25 inch, and the aft edge 258 can have a radius TEr of from about 0.1 inch to about 1 inch, or about 0.25 inch. In addition, the tip 254 can have a radius Tr of from about 0.1 inch to about 2 inches, or from about 1 inch at the midpoint MT to about 0.25 inch at the forward edge 256 and about 0.25 inch at the aft edge 258. Making the tip portion of the fin 150 rounded instead of flat can provide gentler stall characteristics. In other embodiments, however, the forward edge 256, the aft edge 258, and/or the tip 254 can have other shapes, sizes, radiuses and/or other dimensions. For example, in a particular embodiment the tip 254 can be flat or at least approximately flat.

In particular embodiments, the fin 150 can be manufactured from suitable materials known in the art, including, for example, suitable metallic materials such as aluminum, titanium, and/or steel. In other embodiments, the fins 150 and/or portions thereof can be manufactured from suitable composite materials, including graphite/epoxy materials and/or other suitable fiber-reinforced resin materials. Such composite structures can include, for example, composite sandwich structures having a suitable core material covered by a laminated facesheet of composite laminates. In further embodiments, the outer surfaces of all or a portion of the fins 150 can include suitable layers and/or coatings (e.g., ablative coatings) for dealing with the potentially high temperatures experienced during ascent and/or descent of the vehicle 100 (FIG. 1A).

As discussed above, the fin 150 can be implemented to provide guidance and control on a vehicle (e.g., a rocket) that flies in a first direction (e.g., nose first or forward) during ascent and a second direction (e.g., tail first or aft-first) during descent. One feature of the fin 150 is that when the vehicle is flying in an ascent direction, as indicated by arrow A, the fin 150 provides a relatively high change in lift force as the angle of attack (a) of the fin 150 changes. Put another way, the fin 150 demonstrates a relatively high lift slope during ascent, with lift stall occurring at an angle of attack a of from about 8 degrees to about 13 degrees, or at about 10 degrees or more. As used herein, the term "lift slope" refers to the slope of a curve describing the lift, or more specifically the coefficient of lift CL, of the fin 150 as a function of angle of attack, a. When the vehicle is flying in a descent direction, however, as indicated by arrow D, the fin 150 demonstrates a relatively low lift slope with a peak lift coefficient CL of at least about 1. Moreover, during descent the fin 150 of this embodiment stalls at angles of attack a greater than about 12 degrees to about 18 degrees, or greater than about 15 degrees. Accordingly, for reasons discussed in more detail below, in the illustrated embodiment the fins 150 are configured to provide a relatively aggressive lift curve during ascent in a nose first direction, and a relatively gradual lift curve, with a relatively high lift peak, during descent in a tail first direction.

In another aspect of the illustrated embodiment, the fin 150 maintains a center of pressure location during all phases of flight that is relatively close to the actuator hinge line 160. This minimizes or at least reduces the torques required to pivot the fin 150 relative to its neutral state and achieve the desired angles of attack. A further aspect of the fin 150 is that it is configured to operate in a flight regime or envelope including both subsonic and supersonic flight, including supersonic flight at a mach number of about four.

As mentioned above, in a particular embodiment the fin 150 can have a symmetrical, or an at least approximately symmetrical airfoil shape (e.g., a diamond-shape or a "double wedge" supersonic airfoil shape). A symmetric airfoil can facilitate predictable behavior during bidirectional flight, and results in the maximum thickness Rt of the root 252 being positioned relatively close to the pivot axis or hinge line 160.

During ascent in the direction of arrow A, the forward edge 256 is the "leading edge" and the planform of the fin 150 represents a relatively low aspect ratio AR lifting surface having a non-swept (or very low sweep) leading edge. In this particular embodiment, this planform creates a moderate to high lift curve slope with stall occurring beyond a desired angle of attack, such as about 10 degrees. During descent in the direction of the arrow D, the aft edge 258 becomes the "leading edge," and the planform represents a relatively low aspect ratio AR lifting surface having a leading edge that is highly swept at an angle of, e.g., about 60 degrees relative to the airflow. During descent, this highly swept, low aspect ratio AR planform can provide a relatively low lift curve slope with maximum lift occurring at relatively high angles of attack across the entire flight regime.

Moreover, during descent this fin planform can provide a lift stall that occurs at angles of attack of about 20 degrees at subsonic speeds, and at more than about 45 degrees at supersonic speeds. During descent, the maximum coefficient of lift can be at least about 1.0 (for subsonic flight) with peak coefficient of lift values closer to about 1.5 during supersonic flight.

A further aspect of the illustrated fin planform is that during both ascent and descent, the center of pressure location is relatively well bounded throughout the range of angles of attack. This can minimize or at least reduce the torque required to control the fin 150. Moreover, with this fin planform many of the aerodynamic conditions that result in relatively high stresses occur when the center of pressure is very close to the hinge line 160. Although the center of pressure position can, in some embodiments, vary to a greater degree, this is expected to occur during fin maneuvers and/or aerodynamic conditions that result in relatively low stresses.

FIG. 3A is a partially schematic, side elevation view of an embodiment of the vehicle 100 during its ascent, as indicated by arrow A. During the ascent or boost phase, the deployable flare 140 is stowed and is accordingly positioned flat against and/or flush with the external surface 103 of the vehicle 100. Moreover, during the ascent phase the landing gear 120 (FIGS. 1A and 1B) can be stowed.

During boost phase, the fins 150 provide a stabilizing effect as they tend to move the center of pressure aft of the vehicle center of gravity. In certain embodiments, the degree of stabilization provided by the fins 150 can be directly proportional to the curve of the lift slope of the fins and, accordingly, the higher the lift slope the greater the degree of stabilization. In certain embodiments, the magnitude of the lift generated by the fins 150 may not be as important as the slope of the lift curve or the need for the lift curve to remain linear, or at least approximately linear, over the operational angle of attack range. As mentioned above, the fins 150 can also pivot to help actively guide and control the vehicle during ascent.

Figure 3B:
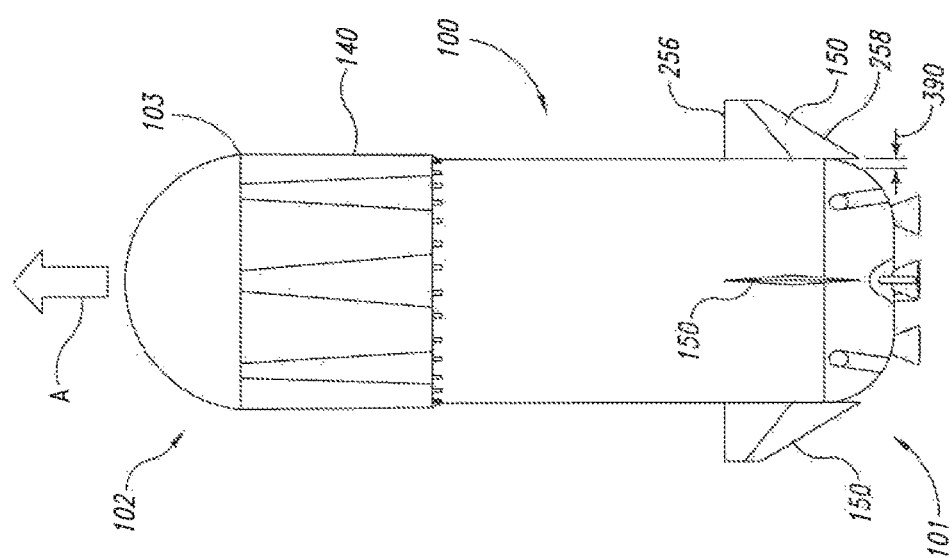

FIG. 3B illustrates the vehicle 100 during its descent phase, as indicated by arrow D. During descent, the deployable flare 140 can be deployed by, for example, pivoting the flare 140 so that it expands outwardly from the external surface 103. As discussed above, this configuration is expected to slow and help stabilize the vehicle 100 during descent. For example, by deploying the flare 140 the center of pressure acting on the vehicle 100 can shift upwardly (e.g., above the vehicle center of gravity) so that gravitational forces acting on the vehicle 100 tend to stabilize perturbations that may be caused by aerodynamic forces acting on the vehicle 100.

During descent of the vehicle 100, the engines are off and no longer thrusting in most, if not all embodiments. In certain embodiments, the engines will remain off and non-thrusting until just prior to touch down of the vehicle 100 in a tail-first orientation at the landing site. As a result, the fins 150 are the dominant aerodynamic control surfaces and the only means, or at least the predominant means, for steering the vehicle 100 during descent.

During descent, the fins 150 are positioned towards the direction of flight and can thus destabilize the vehicle. In certain embodiments, however, having a relatively gentle lift curve can minimize, or at least reduce, the aerodynamic destabilization effect of the fins 150 during descent. However, because the fins 150 are used for vehicle guidance and control during descent, it is also desirable for the fins 150 to be able to provide sufficiently high levels of peak lift. This peak lift will enable the fins 150 to orient the vehicle to relatively large angles of attack when needed during descent.

In another aspect of the illustrated embodiment, the fins 150 are located relatively far aft on the vehicle 100. This can maximize, or at least increase, the ability of the fins 150 to stabilize the vehicle 100 during ascent and control the vehicle 100 during descent. As discussed above with reference to FIGS. 1A and 1B, the aft surface 170 of the vehicle 100 can be rounded in the transition region 174 between the relatively flat base region 172 and the external surface 103 of the propulsion module 110. As a result, moving the fins 150 aft produces a slight overhang gap 390 between the inboard tip of the aft edge 258 (FIG. 2A) and the transition region 174 of the aft surface 170. It is expected, however, that the overhang gap 390 will not negatively affect operation of the fins 150 over the flight regime and mission, including both forward travel during ascent and aft travel during descent.

During descent, the fins 150 are positioned sufficiently behind a bow shock 380. The relatively flat base region 172 of the aft surface 170 tends to move the bow shock 380 outwardly in front of the aft surface 170 during descent of the vehicle 100. As a result, the fins 150 are positioned generally aft or behind the bow shock 380, which can avoid or at least reduce shocks and other high loads on the fins 150 during descent.

There are various aspects of the fin design that are expected to provide favorable characteristics for use with a reusable launch vehicle that can ascend in a nose-first direction and descend in a tail-first direction. For example, the fins 150 are relatively small and, as a result, remain positioned behind the bow shock 380 during both descent and ascent. As discussed above, this can prevent or at least reduce the likelihood that shocks will directly impinge on the fin surface and create high local loads or unsteady, buffeting loads during flight. The relatively short fin span S (FIG. 2A) also facilitates working around the vehicle and performing ground maneuvers such as vehicle lifting, rotation, and/or transportation with conventional on-site equipment.

Figure 4A:
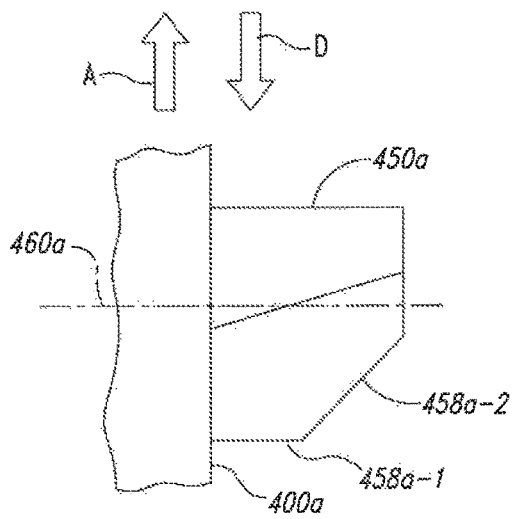
FIGS. 4A-4D are plan views of bidirectional control surfaces configured in accordance with other embodiments of the disclosure.

FIGS. 4A-4D are a series of side elevation views of portions of launch vehicles 400a-d having bidirectional control surfaces or fins 450a-d configured in accordance with other embodiments of the disclosure. Referring first to FIG. 4A, the fin 450a is at least generally similar in structure and function to the fin 150 described in detail above. However, in the illustrated embodiment the fin 450a includes an aft edge 458 having a non-swept inboard portion 458a-1 and a highly swept outboard portion 458a-2 (e.g., an outer one-half portion). In one aspect of this embodiment, having the aft edge 458 with a straight inboard portion 458a-1 and a highly swept outboard portion 458a-2 may result in a fin with earlier stall characteristics than the fin 150 described in detail above.

Figure 4B:
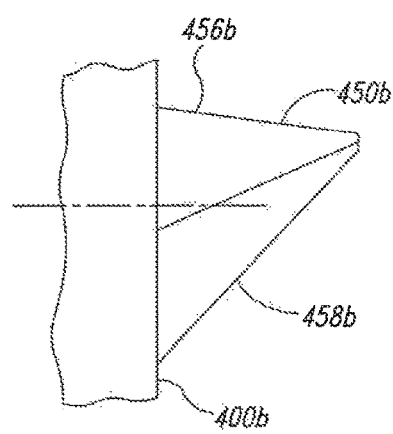
Figure 4C:
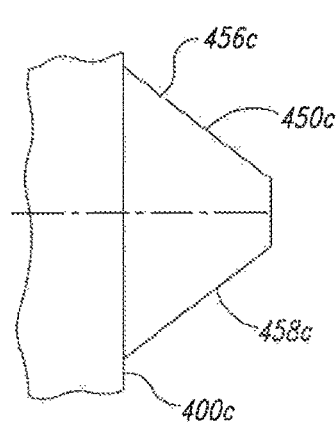
Figure 4D:
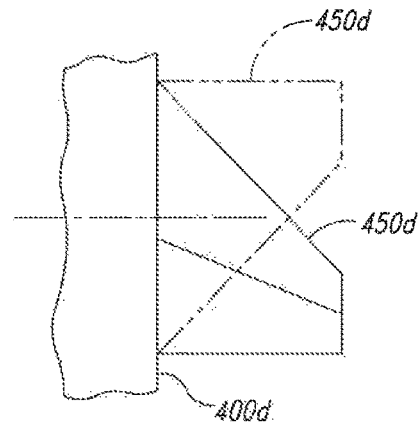

FIG. 4B illustrates a fin 450b having a relatively low or moderately swept forward edge 456b and a relatively highly swept aft edge 458b. Referring next to FIG. 4C, the fin 450c has a symmetrical, or an at least approximately symmetrical planform in which both a forward edge 456c and an aft edge 458c are moderately to highly swept. Referring next to FIG. 4D, in this embodiment the fin 450d has a highly swept forward edge 456d and a non-swept or relatively low sweep aft edge 458d. In this particular embodiment, however, the fin 450d can rotate a full 360 degrees about a hinge line 460d to that the planform can be optimized for the direction of flight. For example, in a particular embodiment the fin 450d can be oriented as shown by the solid line in FIG. 4D for ascent, and then rotated 180 degrees about the hinge line 460*d* to the position shown by the dotted line in FIG. 4D for descent. Although the fins illustrated in FIGS. 4A and 4D can have symmetrical cross-sections (e.g., diamond-shaped cross-sections), in other embodiments these fin configurations and variations thereof can have non-symmetrical cross-sections.

Figure 5B:
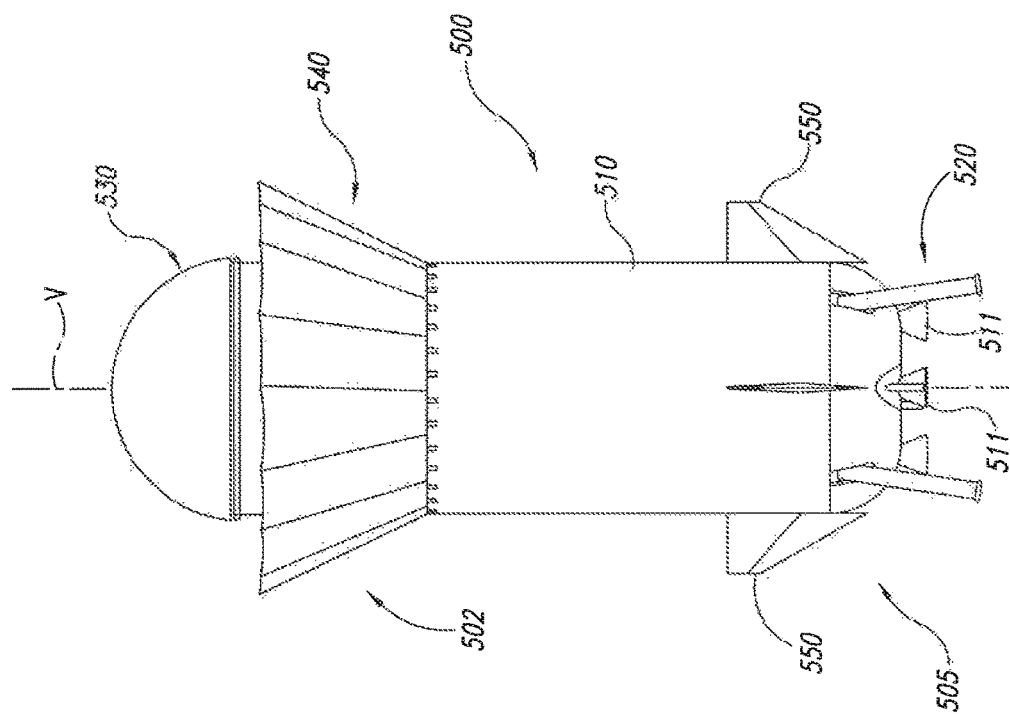
FIGS. 5A and 5B illustrate a representative vehicle having a deployable flare surface in accordance with an embodiment of the disclosure.
Figure 5A:
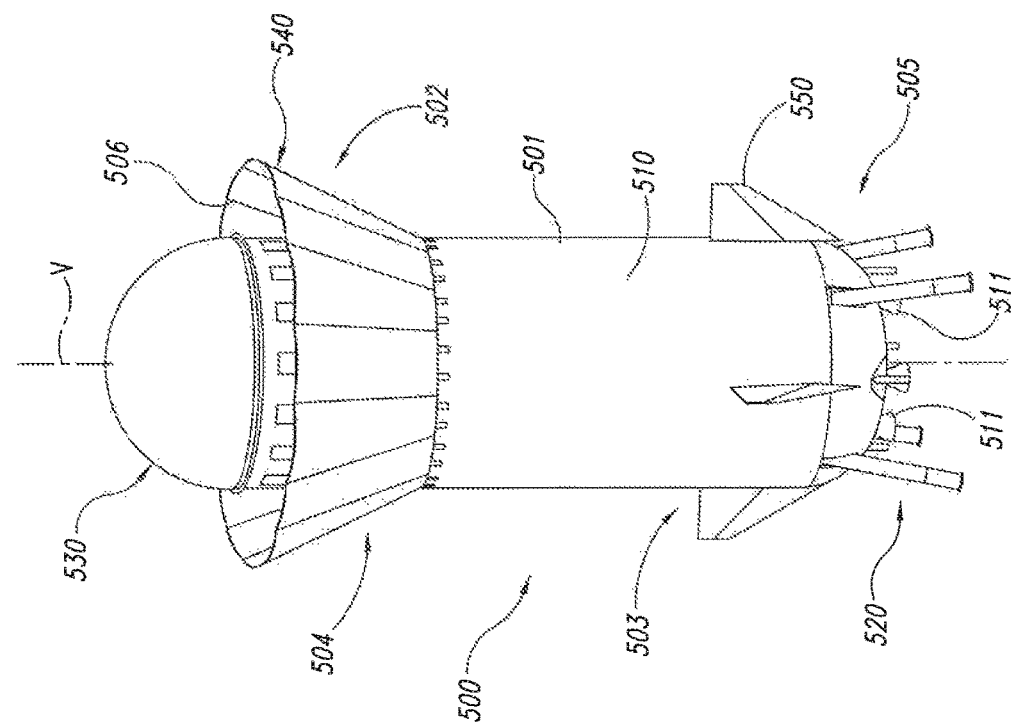

FIG. 5A is a top isometric illustration of a vehicle 500 configured in accordance with an embodiment of the disclosure. FIG. 5B is a side elevation view of the vehicle 500 shown in FIG. 5A. Referring to FIGS. 5A and 5B, the vehicle 500 can be a rocket (e.g., an orbital or suborbital vehicle) that includes a propulsion module 510 carrying a payload module 530. The propulsion module 510 can include one or more engines having corresponding engine exhaust nozzles 511 positioned toward a first or aft end 505 of the vehicle 500. The vehicle 500 can be elongated along a longitudinal vehicle axis V, with an outwardly facing, exposed surface 501 having a first region 503 toward the first end 505, and a second region 504 positioned toward a second or forward end 502 of the vehicle 500. The vehicle 500 can include landing gear 520 positioned toward the first end 505 to allow the vehicle 500 to land in a tail-down orientation. The vehicle 500 can further include a deployable or otherwise movable deceleration surface (e.g., a flare surface) 540 positioned toward the second end 502 of the vehicle 500. The deployable surface 540 can be stowed during ascent and deployed during descent to stabilize and reduce the speed of the vehicle 500 during a tail-down descent and landing. In particular embodiments, the deployable deceleration surface 540 can elevate the aerodynamic center of pressure of the vehicle 500 (e.g., above the center of gravity of the vehicle 500) in such a manner as to improve stability and/or improve the ratio of vehicle aerodynamic lift to drag during a tail-down descent and landing. Fins 550 toward the aft end 505 of the vehicle 500 can act as stabilizers and/or control surfaces during ascent, and can also act as stabilizers and/or control surfaces during descent. Accordingly, the fins 550 can be operated in a forward direction (e.g., during ascent), and in a reverse direction (e.g., during descent), as described herein.

In a particular embodiment, the payload module 530 can be configured to carry cargo and/or crew. In an embodiment shown in FIGS. 5A and 5B, the payload module 530 can have a hemispherical shape and in other embodiments, the payload module 530 can have other shapes.

In a particular embodiment, the vehicle 500 includes five engines internal to the vehicle 500 (and not visible in FIGS. 5A and 5B), each having a corresponding engine exhaust 511. The engines are used during the boost phase to propel the vehicle 500 upwardly (e.g., vertically, with or without a downrange component). Optionally, the engines can also provide thrust vectoring to steer the vehicle 500 during the boost phase, alone or in combination with other control systems.

After the engines have completed the boost phase, the deployable surface 540 can be deployed to slow the descent of the vehicle 500. The deployable surface 540 can improve vehicle stability as the vehicle 500 descends (tail-down) by increasing vehicle drag and by reducing the terminal velocity of the vehicle 500 before the engines restart prior to a vertical landing. In a particular embodiment, the deployable surface 540 is used only once during flight, and is then retracted by the ground crew after the vehicle 500 has landed. The fins 550 can be used to control and steer the vehicle 500 during descent and landing. Accordingly, the vehicle 500 can be steered directly back to the site from which it was launched. In other embodiments, the vehicle 500 can be steered to other sites. In any of these embodiments, as the vehicle 500 approaches the landing site, the engines can be restarted to further slow the vehicle 500 down. The landing gear 520 are then deployed for final touchdown.

FIG. 6A is a partially schematic, side elevation view of an embodiment of the vehicle 500 during its ascent, indicated by arrow A. During the ascent phase, the deployable surface 540 (which forms part of the external surface 501) is stowed and can accordingly be positioned flat against an underlying surface 506 of the vehicle 500, and generally flush with the rest of the external surface 501. During the ascent phase, the landing gear 520 (FIGS. 5A, 5B) are stowed.

FIG. 6B illustrates the vehicle 500 during its descent phase, indicated by arrow D. During descent, the deployable surface 540 is deployed, e.g., by pivoting the surface 540 so that it expands outwardly from the underlying surface 506. As discussed above, this configuration is expected to slow the vehicle 500 down and can also stabilize the vehicle. For example, as noted above deploying the surface 540 can shift the center of pressure acting on the vehicle 500 upwards (e.g., above the vehicle center of gravity) so that gravitational forces on the vehicle 500 tend to stabilize perturbations that may be caused by aerodynamic forces acting on the vehicle 500.

One effect of deploying the surface 540 is to increase the cross-sectional area or planform footprint of the vehicle 500 at the second region 504, relative to the first region 503. For example, the cross-sectional area of the vehicle 500 taken at a first station 591 (including the cross-sectional area of the fins 550) or a second station 592, both located within the first region 503, will be less than the cross-sectional area of the vehicle 500 at a third station 593, located in the second region 504 when the deployable surface 540 is deployed. This change in cross-sectional area can be temporary, by virtue of the ability to subsequently stow or otherwise move the deployable surface 540. In other embodiments described later with reference to FIGS. 11-14, the increased cross-sectional area can be a fixed part of the vehicle external geometry.

Figure 7A:
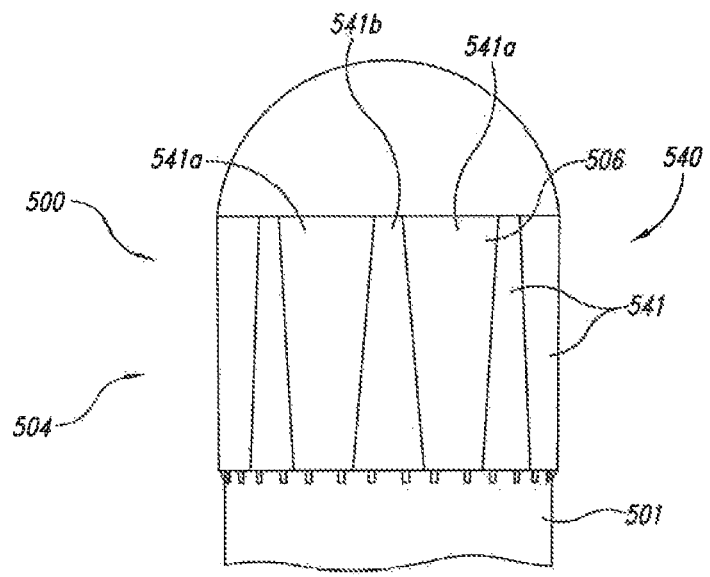
FIGS. 7A and 7B are enlarged illustrations of a portion of a representative vehicle illustrating a deployable flare surface in a stowed position and a deployed position, respectively.

FIG. 7A is a partially schematic, side view of the second region 504 of the vehicle 500, with the deployable surface 540 stowed, for example, during a boost or ascent phase of the vehicle 500. The deployable surface 540 can include multiple, deployable petals 541 or other suitable surfaces or surface elements. In the stowed configuration, the petals 541 are closed up against the underlying surface 506 of the vehicle 500. Accordingly, the petals 541 can be formed from sections of a cylinder so as to conform to the shape of the cylindrical external surface 501. In other embodiments, the petals 541 can have other shapes. In any of these embodiments, outer petals 541*a* can alternate with and overlap intermediate inner petals 541*b*.

Figure 7B:
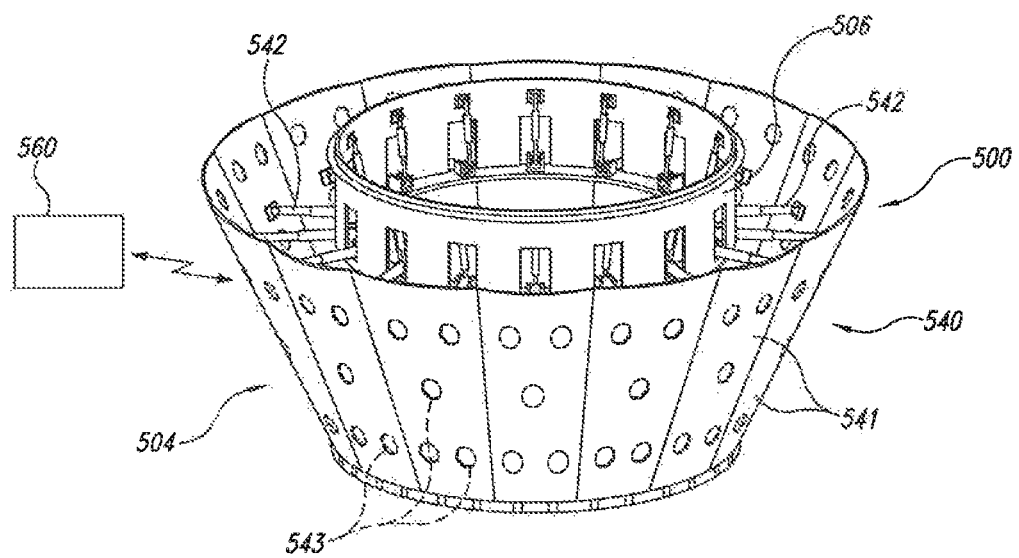

FIG. 7B is a partially schematic, top isometric illustration of the second region 504 of the vehicle 500, illustrating the deployable surface 540 in a deployed configuration. In this configuration, the petals 541 have been pivoted outwardly from the underlying surface 506 of the vehicle 500, for example, via one or more actuators 542. In a particular embodiment, adjacent petals 541 can overlap each other when stowed, and can overlap or abut each other when deployed. In other embodiments, the petals 541 can be spaced apart or at least partially spaced apart when deployed. The particular arrangement selected for the deployable surface 540 can depend upon the level of braking expected to be provided by the deployable surface 540, integration with the vehicle 500, and/or other factors.

In a particular embodiment, the deployable surface 540 includes 16 petals 541, each deployed by a separate pneumatic, hydraulic, electric or other actuator. The petals 541 can overlap with each other when stowed, with a first set of eight petals 541 positioned outside and a second set of eight petals 541 positioned inside and interleaved with petals of the first set, so that no significant gaps exist between adjacent petals 541 when the flare 540 is fully deployed. The vehicle 500 can include retention latches or other features that hold the petals 541 in the stowed position before the command is given to open them. In a particular embodiment, the second region 504 of the vehicle 500 can include composite sandwich panels, backed by aluminum ring frames for additional stiffness. The petals 541 can also be formed from composite sandwich panels. In other embodiments, any of these structures can have other compositions.

In a particular embodiment, the individual petals 541 are moved in concert, so that each one moves by the same amount, at the same rate and in the same direction (e.g., outwardly or inwardly) as the others. In other embodiments, the individual petals 541 of the deployable surface 540 can be individually movable and/or controllable. In such embodiments, the petals 541 can be moved relative to each other at different rates, by different amounts and/or in different directions, e.g., to steer the vehicle 500 in addition to slowing it down. The motion of the petals 541 can be controlled by a controller 560. In one embodiment, the controller 560 is an electromechanical device that is carried by the vehicle 500. In other embodiments, the controller 560 is a digital or computer-based device 560 carried by the vehicle 500 or based on the ground, and having computer-readable media containing appropriate instructions. The controller 560 can receive input signals from any of a variety of sensors (e.g., an accelerometer, a GPS sensor, an altitude sensor, a pressure sensor, or a time sensor (e.g., a clock)), on the basis of which the controller 560 issues instructions for operating the petals 541. The controller 560 can control other vehicle functions as well, e.g., the operation of the engines, landing gear and control surfaces.

As discussed above, the petals 541 can sealably engage with each other when deployed. In other embodiments, neighboring petals can be spaced apart from each other when deployed, forming axially extending gaps. In still another embodiment, the petals 541 can be vented. For example, the petals 541 can include vent openings 543 (shown in dashed lines in FIG. 7B) that allow air to pass through the petals 541. The vent openings 543 can be arranged in a checkerboard or other suitable pattern. In a further aspect of this embodiment, individual vent openings 543 can be selectively opened and closed (e.g., via an actuated panel, iris, or other suitable device) to control the flow of air through the openings 543. In this manner, the drag created by the deployable surface 540 can be controlled. In a further aspect of this embodiment, the vent openings 543 at one circumferential location can be opened and those at another circumferential location can be closed to provide a differential drag that can in turn be used to steer the vehicle 500.

Figure 8A:
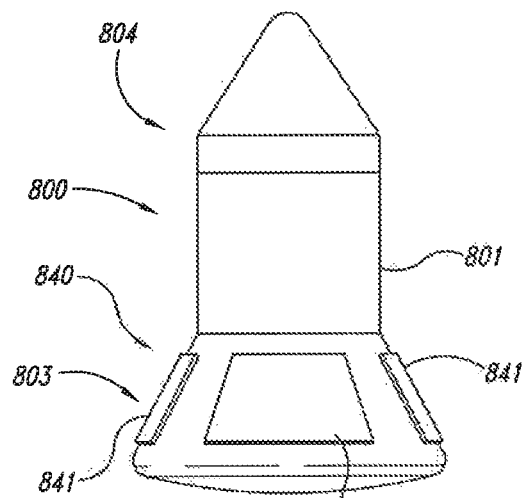
FIG. 8A is a partially schematic, side elevation view of a vehicle having stowed deployable surfaces configured in accordance with another embodiment of the disclosure.
Figure 8B:
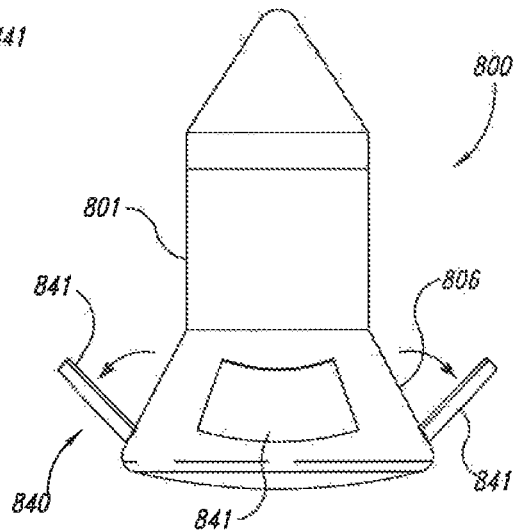
FIG. 8B is a partially schematic, side elevation view of the vehicle shown in FIG. 8A, with the deployable surfaces deployed.
Figure 8C:
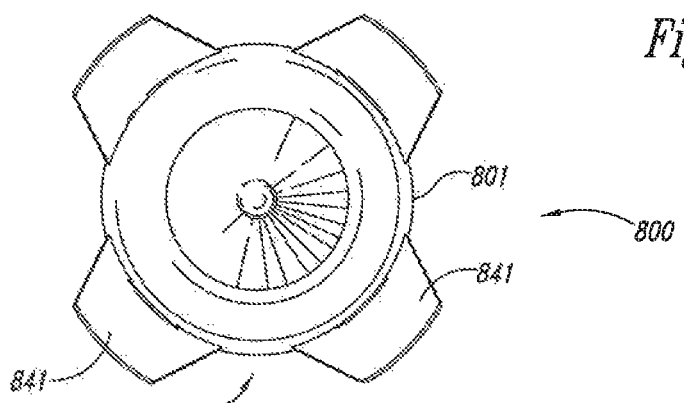
FIG. 8C is a partially schematic, plan view of the vehicle shown in FIG. 8B, with the deployable surfaces deployed.

In the embodiments described above with reference to FIGS. 5A-7B, the deployable surface is positioned toward the upper or second end of the vehicle. FIG. 8A is a partially schematic, side elevation view of a vehicle 800 having a deployable surface located toward the lower end in accordance with another embodiment of the disclosure. In one aspect of this embodiment, the vehicle 800 has an external surface 801 with a first or lower region 803 having an outwardly flared shape, and a second or upper region 804 above the first region 803. The deployable surface 840 is located at the first region 803. The deployable surface 840 can include four deployable panels 841 (three of which are visible in FIG. 8A) which are shown in the stowed position. FIGS. 8B and 8C illustrate side elevation and plan views, respectively, of the vehicle 800, with the deployable surface 840 in the deployed position. In this position, the panels 841 are pivoted outwardly away from an underlying surface 806 of the vehicle 800 to increase the cross-sectional area of the vehicle 800 beyond that produced by the flared outer surface 801 at the first region 803. This arrangement can further enhance the stability of the flared body shape on descent.

Figure 9A:
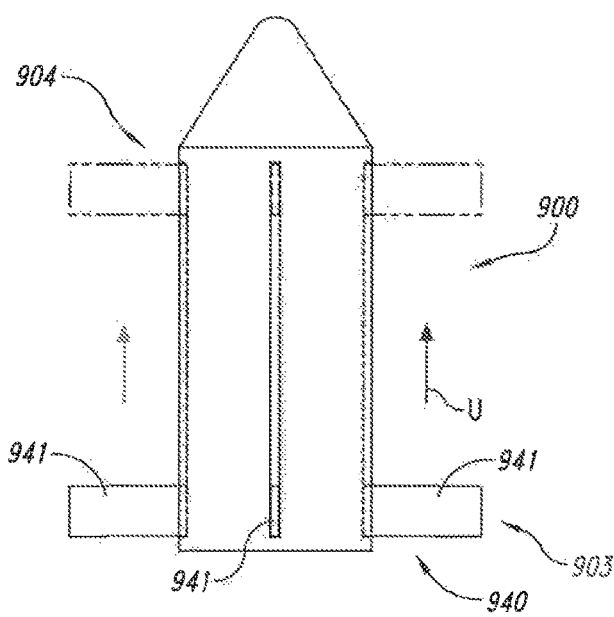
FIGS. 9A and 9B are partially schematic, side elevation and plan views, respectively, of a vehicle having translating surfaces in accordance with an embodiment of the disclosure.
Figure 9B:
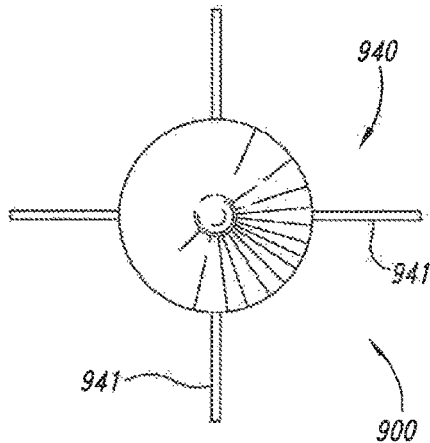

FIG. 9A is a partially schematic, side elevation view of a vehicle 900 having a deployable surface 940 that translates rather than pivots during operation. FIG. 9B is a partially schematic, top plan view of the vehicle 900 shown in FIG. 9A. Referring now to FIGS. 9A and 9B together, the deployable surface 940 can include multiple fin or vane elements 941 (four are shown in FIGS. 9A and 9B) that are positioned toward a first or lower region 903 of the vehicle 900 during ascent. Accordingly, the deployable surfaces 940 can provide stability and, optionally, control of the vehicle 900 from a position below the vehicle center of gravity. Prior to or during a tail-down descent, the fin elements 941 translate upwardly as indicated by arrows U so as to be located at a second or upper region 904 of the vehicle. In this position, the fin elements 941 can act to move the center of pressure of the vehicle 900 upwardly, for example, above the vehicle center of gravity. Because the fin elements 941 are lift-generating devices, the vehicle will typically cant over from a purely vertical inclination to provide an angle of attack that allows the fins to generate sufficient lift. The vehicle 900 can return to a fully vertical position prior to touching down. The vehicle 900 can include tracks, rails, or other suitable guide structures to guide the translational motion of the fin elements 941.

Figure 10A:
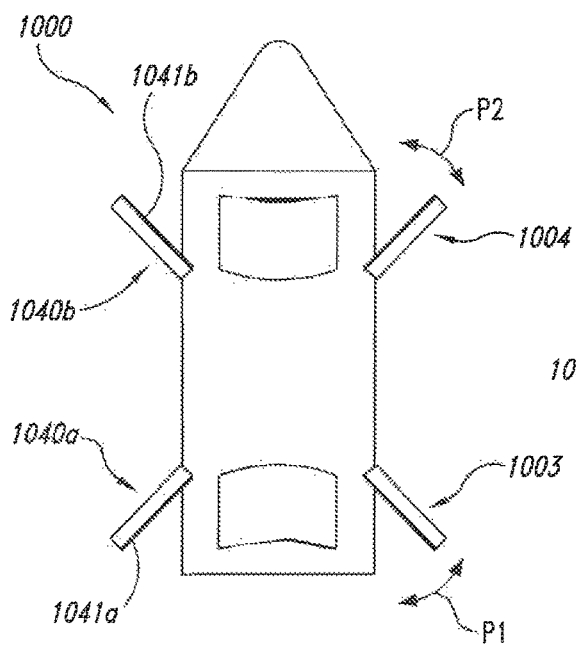
FIGS. 10A and 10B are partially schematic, side elevation and plan views, respectively, of a vehicle having two sets of deployable flare surfaces in accordance with an embodiment of the disclosure.
Figure 10B:
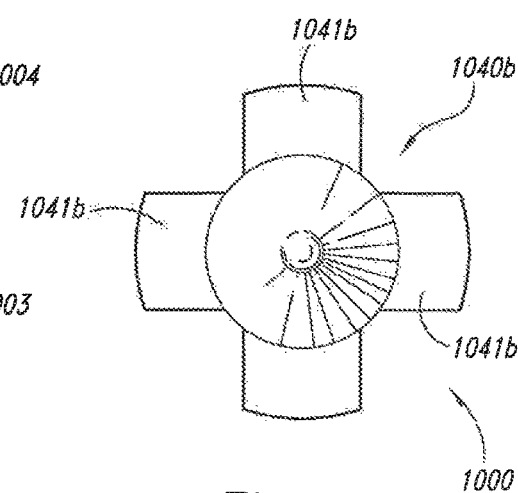

FIGS. 10A and 10B are partially schematic, side elevation and top plan views, respectively, of a vehicle 1000 having multiple deployable surfaces that operate in concert to control the location of the vehicle center of pressure relative to the vehicle center of gravity. In particular, the vehicle 1000 can include a first or lower deployable surface 1040a positioned at a first or lower region 1003 of the vehicle 1000, and a second or upper deployable surface 1040b positioned at a second or upper region 1004 of the vehicle 1000. The first deployable surface 1040a can include first flare elements 1041a, and the second deployable surface 1040b can include second flare elements 1041b. Both the first flare elements 1041a and the second flare element 1041b can deploy outwardly relative to the vehicle 1000 and then return to a stowed position as indicated by arrows P1 and P2, respectively. During ascent, the second flare elements 1041b can be stowed generally parallel to the external surface of the vehicle 1000, while the first flare elements 1041a are pivoted outwardly to provide stability and/or control. In a particular embodiment, the first flare elements 1041a can remain stowed during ascent, unless needed to provide additional stability. Such a need may arise if one or more engines fail during ascent. During descent, the relative orientations of the first and second flare elements 1041a, 1041b can be reversed. In particular, the first flare elements 1041a can be stowed generally parallel to the exterior surface of the vehicle 1000, while the second flare elements 1041b are deployed to provide a center of pressure movement generally similar to that described above with reference to FIGS. 5A-6B.

In several of the embodiments described above, deployable surfaces control the change in center of pressure between vehicle ascent and vehicle descent. In other embodiments, described below with reference to FIGS. 11-14, the overall shape of the vehicle can remain fixed, but can have a cross-sectional shape variation between the lower end of the vehicle and the upper end of the vehicle that provides increased drag during descent when compared to a conventional cylindrical or upwardly and inwardly tapered rocket shape. Accordingly, the external surface of the vehicle can be positioned (e.g., fixed) or positionable (e.g., movable) to achieve the desired cross-sectional shape variation.

Figure 11:
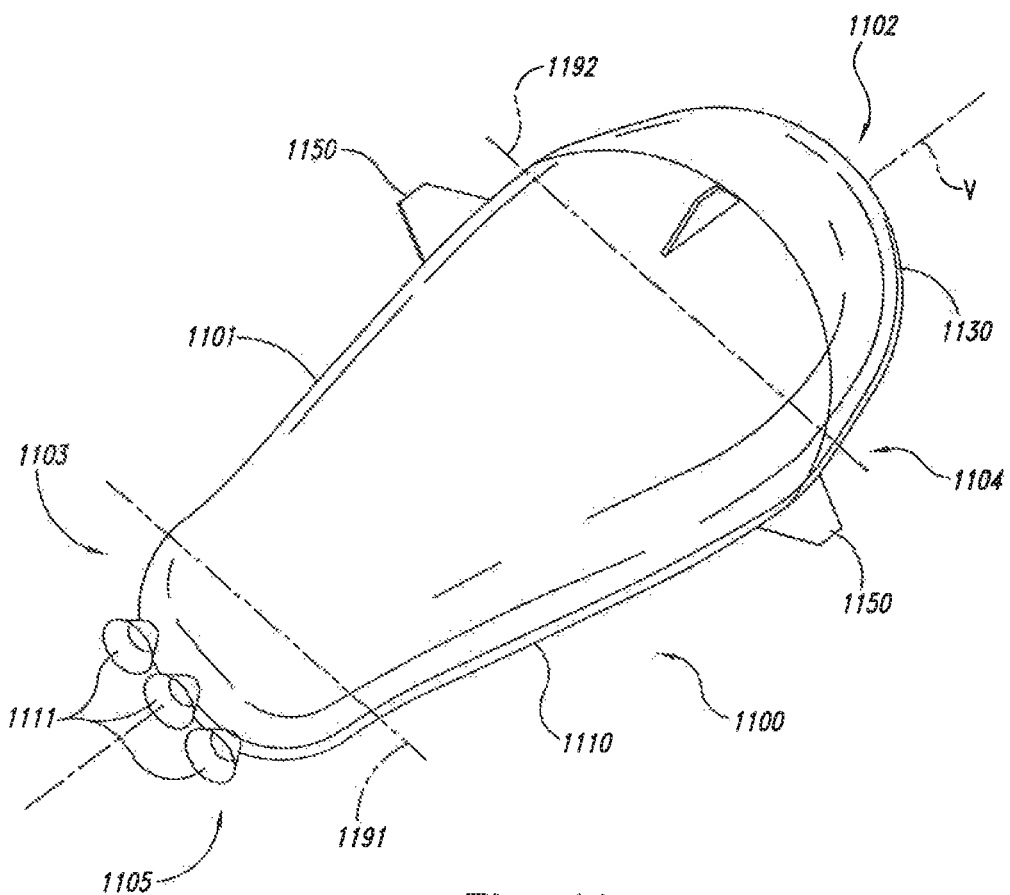
FIG. 11 is a partially schematic, isometric illustration of a vehicle having an upwardly and outwardly tapered shape in accordance with an embodiment of the disclosure.

FIG. 11 is a partially schematic, isometric illustration of a launch vehicle 1100 elongated along a vehicle axis V between a first end 1105 and a second end 1102. The vehicle 1100 includes a payload module 1130 toward the second end 1102, and a propulsion module 1110 with one or more exhaust nozzles 1111 toward the first end 1105. In a particular embodiment, the vehicle 1100 includes three exhaust nozzles 1111, the outer two of which are fixed, and the center one of which is vectorable for vehicle control. In other embodiments, the vehicle 1100 can have other numbers and/or arrangements of engines and associated nozzles. The vehicle 1100 can also include fins 1150 that may be actuated to provide additional vehicle control during both ascent and descent. An external surface 1101 of the vehicle 1100 includes a first region 1103 toward the first end 1105, and a second region 1104 toward the second end 1102. The cross-sectional area of the vehicle 1100 bounded by the external surface 1101 increases along the vehicle axis V from the first region 1103 to the second region 1104. Accordingly, a cross-sectional area of the vehicle 1100 at a first station 1191 in the first region 1103 is smaller than the corresponding cross-sectional area at a second station 1192 located in the second region 1104.

The shape of the external surface 1101 of the propulsion module 1110 and the payload module 1130 can be selected to produce the desired drag characteristics for both ascent and descent. In particular, the shape of the external surface 1101 is generally selected to reduce or minimize buffet during ascent, particularly at transonic speeds, while providing aerodynamic forces that stabilize the vehicle during tail-down descent.

One characteristic of the arrangement described above with reference to FIG. 11 is that it can eliminate the need for deployable deceleration surfaces. Accordingly, it is expected that this arrangement may reduce the overall vehicle weight. Conversely, an expected advantage of the deployable surfaces described above with reference to FIGS. 5A-10B is that they may provide more decelerating force than the drag produced by the outer mold line (OML) of the vehicle 1100, thereby reducing the amount of fuel used by the engines to decelerate the vehicle during descent. This arrangement can offset or partially offset the additional weight expected to result from the deployable surfaces. The particular selection of deceleration surfaces (e.g., deployable surfaces or fixed, flared surfaces) can depend on a variety of factors, including the mission that the vehicle is to undertake, and the payload the vehicle is to carry. These two arrangements need not be mutually exclusive. Accordingly, in other embodiments, deployable surfaces may be combined with fixed OML shapes to provide the desired combination of deceleration forces and vehicle weight.

Figure 12A:
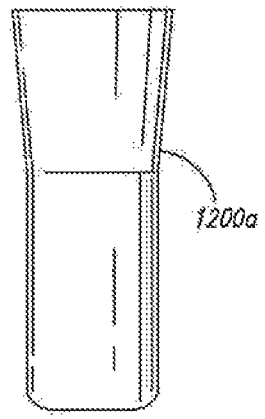
FIGS. 12A-12F are partially schematic, side elevation views of portions of vehicles having upwardly and outwardly tapered shapes in accordance with further embodiments of the disclosure.
Figure 12B:
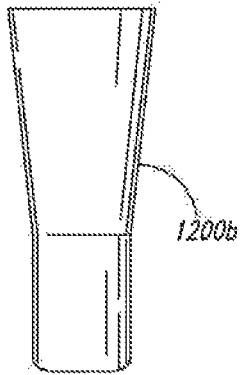
Figure 12C:
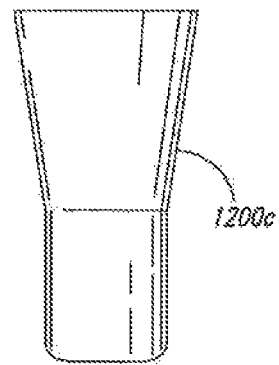
Figure 12D:
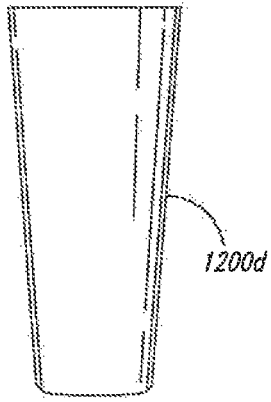
Figure 12E:
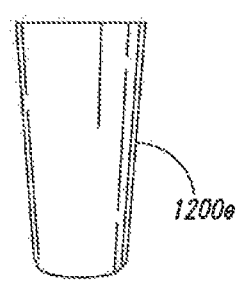
Figure 12F:
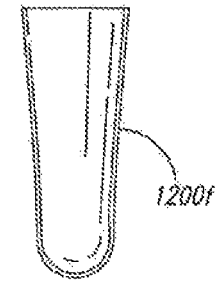

Whether used alone or in combination with deployable deceleration surfaces, the fixed outer surface of the vehicle can have a variety of shapes that are expected to increase drag during vehicle descent, without unduly adding to vehicle drag during ascent. FIGS. 12A-12F illustrate a representative selection of such vehicle shapes. For purposes of illustration, the payload modules and engine/nozzle arrangements, as well as other external vehicle features (e.g., fins) are not shown in FIGS. 12A-12F. During operation, the payload module may descend separately from the propulsion module as shown in FIGS. 12A-12F, or it can remain attached to the propulsion module during descent, as shown in FIG. 11. FIGS. 12A-12C illustrate corresponding vehicles 1200a, 1200b, 1200c, respectively, having OML surfaces that vary in a non-monotonic manner over the length of the corresponding vehicle axis. In particular, these shapes include a generally cylindrical portion toward the lower end of the vehicle, and an outwardly, upwardly tapering section toward the upper end of the vehicle. The taper can be linear (e.g., conical) or nonlinear (e.g., concave or convex). In other embodiments, illustrated in FIGS. 12D, 12E and 12F, corresponding vehicles 1200d, 1200e and 1200f, respectively, include external surfaces that taper in a continuous manner from the lower end of the vehicle to the junction with the corresponding payload capsule (not shown). The particular divergence angle of the surfaces relative to the vehicle axis can be selected in a manner that depends, for example, on the vehicle mission and the vehicle payload to provide a large amount of drag during descent, and a small and incremental increase in drag during ascent.

In any of the foregoing embodiments, fuel is carried in tanks positioned within (or forming part of) the external surface of the vehicle. Liquid propellant tanks configured in accordance with particular embodiments of the present disclosure, and suitable for launch vehicles, have shapes that are customized so as to (a) reduce the dynamic effects of sloshing fluid within the tank, and (b) fit within the upwardly, outwardly tapered vehicle OML. For example, the tank OML can be varied by modulating the radius of the tank so as to reduce the destabilizing effects of the sloshing fluid. In a further particular aspect of this embodiment, the fuel tank can include internal slosh baffles that are molded into a plastic tank liner. This arrangement can eliminate the need to mechanically fasten baffles inside the tank. In other embodiments, the baffles can be formed from within the tank. In a further aspect of the foregoing embodiments, the shape of the tank can be configured to enhance and/or optimize the propellant's center of mass location within the vehicle so as to reduce the destabilizing effects that might otherwise result when liquid propellant within the tank sloshes during normal operations.

Figure 13:
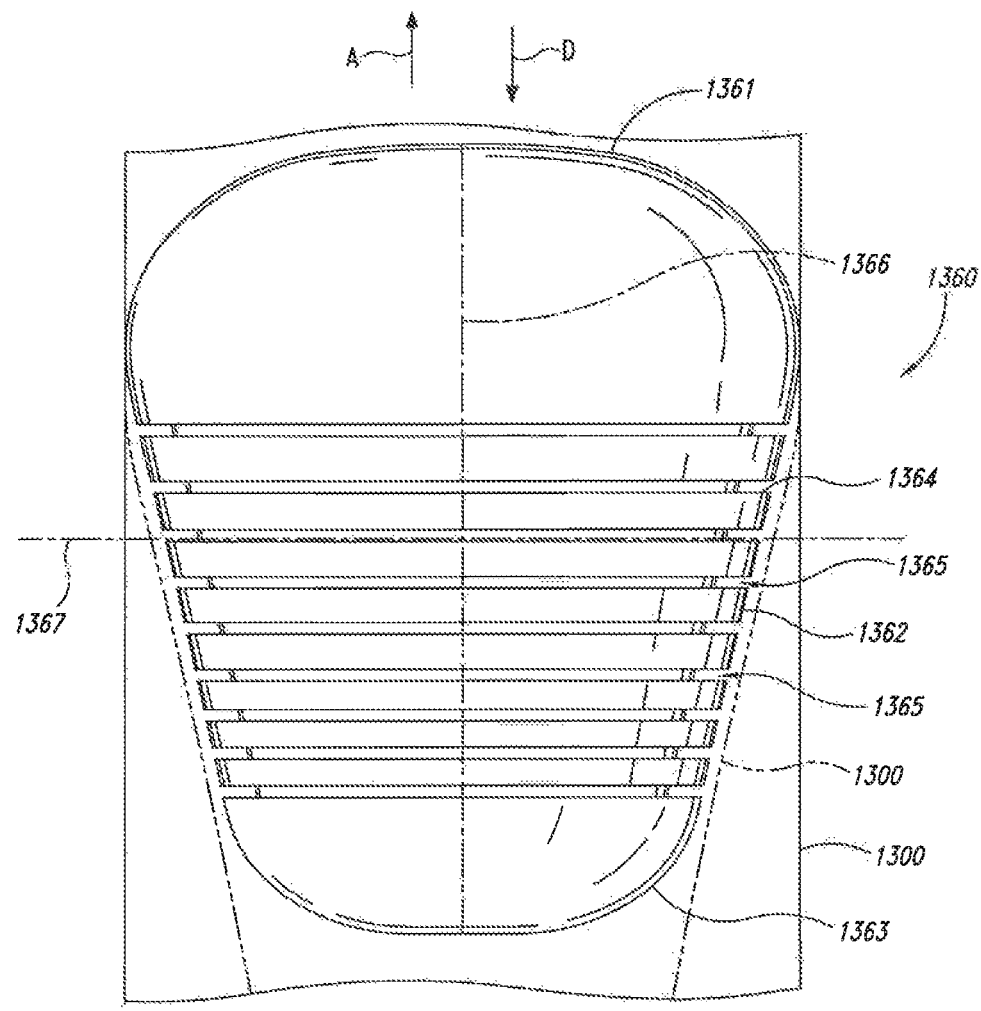
FIG. 13 is a partially schematic, isometric illustration of a fuel tank having a shape and features configured in accordance with still another embodiment of the disclosure.

FIG. 13 is a partially schematic, side elevation view of a portion of a vehicle 1300 (e.g., a rocket) having a fuel tank 1360 configured in accordance with a particular embodiment of the disclosure. The vehicle 1300 can have a generally cylindrical shape as shown in solid lines in FIG. 13, or the vehicle can have any of the upwardly, outwardly tapered shapes described above, as shown in dashed lines in FIG. 13. In a particular aspect of this embodiment, the liquid propellant tank 1360 has a larger forward or upper region 1361 with a generally dome-shaped external surface, and smaller aft or lower region 1363 also with a generally dome-shaped external surface, but with a smaller diameter than that of the forward region 1361. The upper and lower regions 1361, 1363 can be positioned on opposite sides of an intermediate region 1362 having a generally conical shape with a radius that varies linearly with length. Accordingly, the tank 1360 can have an overall "pear" type shape, and can be symmetric about a tank longitudinal midline axis 1366. However, the shape of the tank 1360 is asymmetric relative to a lateral midline axis 1367. This shape can be selected based on the available height and volume inside the vehicle 1300, by the desire to adjust the propellant center of mass from high in the vehicle 1300 during ascent to lower in the vehicle 1300 during descent, by the shape (e.g., tapered shape) of the vehicle OML, and/or by the desire to modulate the slosh damping requirement for various propellant fill fractions.

As discussed above, the vehicle 1300 can be configured to move in a forward direction (e.g., nose first) during ascent, as indicated by arrow A, and can move in an aft direction (e.g., tail first) during descent, as indicated by arrow D. In at least some embodiments, it is desired to keep the propellant center of mass high in the vehicle 1300 during ascent. In addition, fuel slosh is less of an issue at the higher fill fractions associated with ascent. Accordingly, the radius of the forward region 1361 can be relatively large relative to the width or diameter of the vehicle 1300. As the propellant free surface drops below the forward region 1361 and into the intermediate region 1362, the propellant center of mass drops more rapidly because the propellant generally flows out of the tank 1360 at a constant volumetric rate, and the tank radius reduces linearly with length. This brings the center of mass lower in the vehicle 1300 to a more desired location for descent stability. The center of mass can accordingly drop more rapidly during later phases of ascent and/or during descent.

In a particular aspect of an embodiment shown in FIG. 13, the fuel tank 1360 can include features that restrict the tendency for fuel to slosh within the tank 1360. For example, the tank 1360 can include baffles 1364 that extend inwardly into the interior region of the tank 1360 to control (e.g., reduce) sloshing. Because slosh frequency and sloshing mass are both nonlinear functions of tank radius, the decreasing tank radius results in a reduction of the sloshing mass and an increase in the slosh frequency, both of which reduce the slosh damping required to maintain vehicle control stability. By lowering the propellant center of mass at lower fill fractions (when slosh is more critical), the moment arm from the propellant center of mass to the vehicle center of mass is shortened and accordingly, the slosh has a reduced destabilizing effect on the vehicle 1300. Due to the tank shape, the propellant free surface drops nonlinearly during a constant outflow rate, and slosh amplitude takes some amount of time to develop. In particular embodiments, the spacing between neighboring slosh baffles 1364 can be varied between the forward region 1361 and the aft region 1363, for example, to account for the above non-linearities. In other embodiments, the baffle spacing can be constant. Because the aft region 1363 holds a much smaller amount of propellant volume, it is less likely that baffles 1364 are required in this region, which can simplify the mold design and fabrication.

In a particular embodiment, the tank 1360 can be formed from a molded plastic liner and graphite/epoxy overwrap. The liner can prevent contact between the fuel and the overwrap. Accordingly, the tank 1360 can be used with fuels (e.g., peroxide fuels) that would otherwise be incompatible with the overwrap. In other embodiments, the tank 1360 can carry other fuels and/or other constituents.

In any of the foregoing embodiments, it may be difficult to install traditional style baffles into the tank 1360 because (in at least some embodiments), the tank liner is fabricated in one piece by rotational molding. Accordingly, one approach is to mold the slosh baffles 1364 as part of the liner. The mold used for this operation can have inwardly extending flanges that form the baffles 1364 and that are withdrawn in an outward direction when the mold is opened, so as to allow the tank 1360 to be removed. This approach creates hollow cavities (e.g., gaps 1365) open to the outer mold line of the liner. These cavities or gaps 1365 can be filled with a low density foam or other material to provide some rigidity for the baffles 1364 projecting into the tank, and to provide a smooth outer surface against which to filament-wind the graphite/epoxy overwrap.

Figure 14:
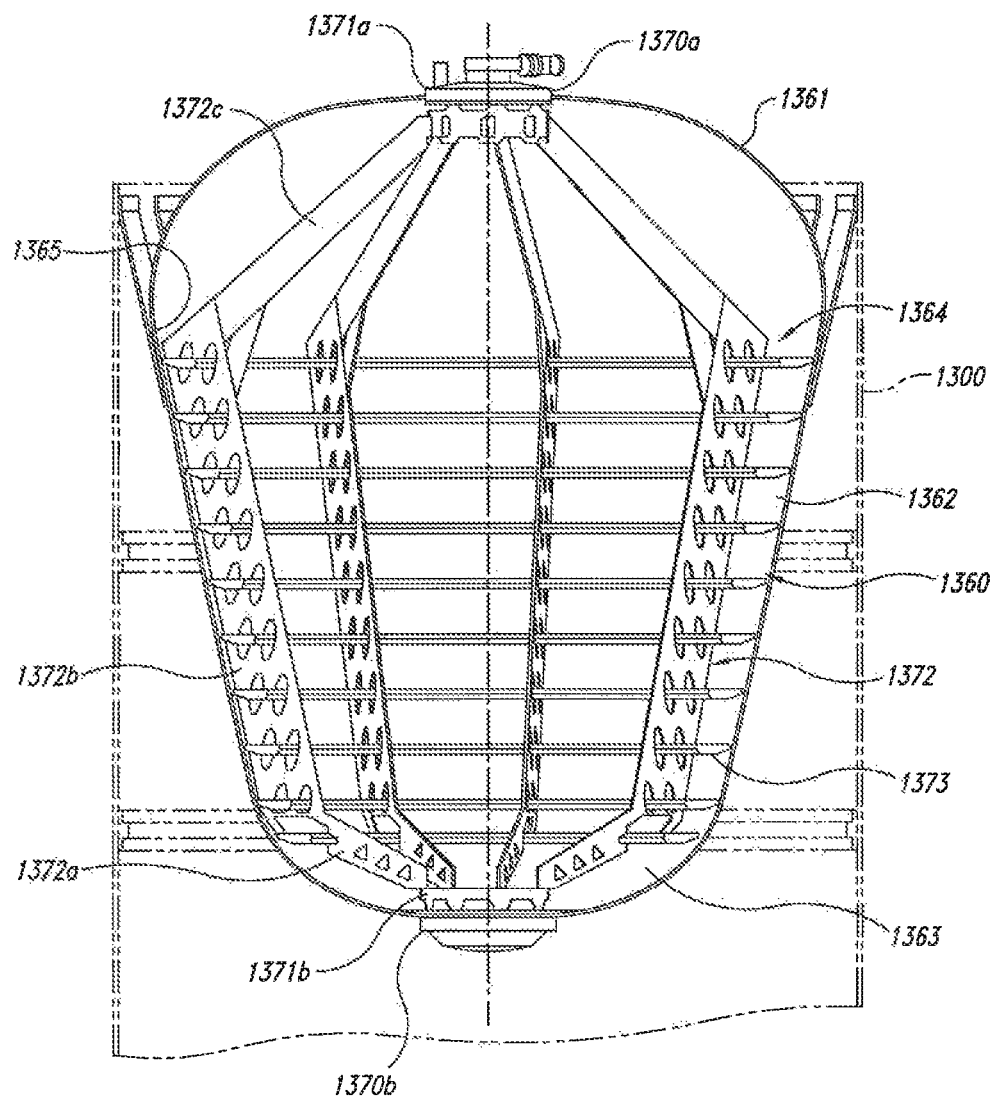
FIG. 14 is a partially cut-away side elevation view of a fuel tank configured in accordance with still another embodiment of the disclosure.

FIG. 14 is a partially schematic, partially cut-away illustration of a fuel tank 1360 positioned in a vehicle 1300 and having baffles 1364 arranged and constructed in accordance with another embodiment of the disclosure. In one aspect of this embodiment, the fuel tank 1360 is pre-formed (e.g., by rotational molding), and the baffles 1364 are added afterwards. The tank 1360 can include one or more manhole covers 1370 (shown as a top manhole cover 1370a and a bottom manhole cover 1370b) to allow access to the interior of the tank 1360. The covers 1370 can also support appropriate fuel entry and/or exit ports in particular embodiments. Support rings 1371 (shown as an upper support ring 1371a and a lower support ring 1371b) are positioned at the inside of the tank 1360 and can be attached proximate to or directly to the manhole covers 1370. The baffles 1364 are connected between and supported by the upper support ring 1371a and the lower support ring 1371b. Accordingly, the baffles 1364 can include axial baffle elements 1372 that extend between the support rings 1371a, 1371b, and lateral baffle elements 1373 that are connected to and extend between neighboring axial baffle elements 1372. The axial baffle elements 1372 can have a flat, panel-type shape and can form "grapefruit" baffles. In particular embodiments, the axial baffle elements 1372 can be connected only to the upper support ring 1371a and the lower support ring 1371b. The lateral baffle elements 1373 can also have a flat, panel-type shape, and can be arranged to form rings positioned within an inner wall 1365 of the tank 1360. The lateral baffle elements 1373 can be connected only to the axial baffle elements 1372. Accordingly, the baffle elements 1372, 1373 can reduce or prevent sloshing, without contacting the inner wall 1365 of the tank 1360. The axial baffle elements 1372 and/or the lateral baffle elements 1373 can be perforated, and can be formed from thin, lightweight materials (e.g., a suitable metal).

In a particular embodiment, the baffles 1364 can be positioned within the tank by opening the upper manhole cover 1370a and lowering an operator into the interior volume of the tank 1360. The operator can receive the elements of the baffle 1364 (e.g., the axial baffle elements 1372 and the lateral baffle elements 1373) and attach the elements to each other and to the support rings 1371a, 1371b. In a particular embodiment, the axial baffle elements 1372 can initially include multiple components, e.g., a lower component 1372a, an intermediate component 1372b, and an upper component 1372c. These components 1372a-1372c can be lowered separately into the tank 1360 and assembled in situ by the operator within the tank. To prevent contact between the operator and the inner wall 1365 of the tank 1360, the operator can be supported by a trapeze or other suitable platform suspended from a gantry or other structure outside the tank. Depending upon the size of the access ports into the tank 1360, certain of the components 1372a-1372c can be pre-attached prior to being lowered into the tank 1360. For example, the lower component 1372a and the upper component 1372b can be attached to each other in a particular embodiment. If the access port is sufficiently large, the entire axial baffle element 1372 can be lowered as a unit into the tank 1360. The lateral baffle elements 1373 can initially be segmented, e.g., with individual segments connected between neighboring axial baffle elements 1373.

From the foregoing, it will be appreciated that specific embodiments of the disclosure have been described herein for purposes of illustration, but that the disclosure may include other embodiments as well. For example, the bidirectional control surfaces 150 can have other shapes and/or arrangements that are different than those shown and described above depending on the type of rocket, mission, etc. The deployable surfaces 540 can have petals 541 with shapes and/or arrangements that are different than those shown and described above. In another example, further features of the fuel tank can be integrated with the launch vehicle. For example, at least part of the external surface of the launch vehicle can be formed by an external surface of the fuel tank. For example, the tapered fuel tank described above with reference to FIGS. 13 and 14 can be combined with any of the disclosed tapered external vehicle surfaces, and/or the tapered external surfaces can be combined with any of the deployable deceleration surfaces described above. Certain aspects of the disclosure described in the context of particular embodiments may be combined or eliminated in other embodiments. Further, while advantages associated with certain embodiments have been described in the context of those embodiments, other embodiments may also exhibit such advantages and not all embodiments need necessarily exhibit such advantages to fall within the scope of the invention. Accordingly, the invention is not limited, except as by the appended claims.

We claim:

1. A rocket for transporting at least one of humans and cargo into space, the rocket comprising:
   a first end portion;
   a second end portion; and
   a plurality of bidirectional control surfaces movably attached to the rocket, wherein each of the bidirectional control surface includes:
      a root portion;
      a distal tip portion spaced apart from the root portion;
      a first edge portion extending between the root portion and the tip portion; and
      a second edge portion extending between the root portion and the tip portion, wherein the first edge portion leads the second edge portion when the rocket is flying in a first orientation in which the first end portion leads the second end portion, and wherein the second edge portion leads the first edge portion when the rocket is flying in a second orientation in which the second end portion leads the first end portion.

2. The rocket of claim 1 wherein each of the bidirectional control surfaces exhibits a first lift slope when the rocket is flying in the first orientation, and wherein each of the bidirectional control surfaces exhibits a second lift slope that is more gradual than the first lift slope when the rocket is flying in the second orientation.

3. The rocket of claim 1 wherein the bidirectional control surfaces are positioned closer to the second end portion than the first end portion, and wherein the rocket further comprises one or more engine exhaust nozzles positioned proximate the second end portion.

4. The rocket of claim 1, wherein the bidirectional control surfaces are configured to pivot back and forth about individual axes to aerodynamically control the rocket when the rocket is flying in the first orientation and when the rocket is flying in the second orientation.

5. The rocket of claim 1, wherein each of the bidirectional control surfaces has a diamond-shaped cross-section.

6. The rocket of claim 1, further comprising one or more engine exhaust nozzles positioned toward the second end portion, wherein the first edge portions of the bidirectional control surfaces face generally away from the second end portion and the second edge portions of the bidirectional control surfaces face generally away from the first end portion, wherein each of the bidirectional control surfaces is configured to rotate back and forth about a corresponding pivot axis, and wherein the pivot axis is positioned between a midpoint of the root and the first edge portion.

7. The rocket of claim 1, further comprising one or more engine exhaust nozzles positioned toward the second end portion, wherein the first edge portions of the bidirectional control surfaces face generally away from the second end portion and the second edge portions of the bidirectional control surfaces face generally away from the first end portion, and wherein the first edge portions have a first sweep angle and the second edge portions have a second sweep angle that is greater than the first sweep angle.

8. The rocket of claim 1, further comprising:
   a payload module positioned toward the first end portion; and
   a booster module positioned toward the second end portion, wherein the plurality of bidirectional control surfaces are attached to the booster module.

9. A method for controlling an airborne vehicle having a first end portion and a second end portion, the method comprising:
   operably coupling at least one rocket engine toward the second end portion,
   pivotally coupling a plurality of fins toward the second end portion;
   aerodynamically controlling the vehicle with one or more control surfaces when the vehicle is flying in a first orientation in which the first end portion leads the second end portion, wherein the one or more control surfaces include the plurality of fins; and
   aerodynamically controlling the vehicle with the one or more control surfaces when the vehicle is flying in a second orientation in which the second end portion leads the first end portion, wherein aerodynamically controlling the vehicle when the vehicle is flying in the first orientation includes pivoting at least one of the fins about a hinge line, and wherein aerodynamically controlling the vehicle when the vehicle is flying in the second orientation includes pivoting the at least one fin about the hinge line.

10. The method of claim 9 wherein the airborne vehicle is a rocket.

11. The method of claim 9 wherein the airborne vehicle is a rocket, and wherein aerodynamically controlling the rocket when the rocket is flying in the first orientation includes aerodynamically controlling the rocket during ascent, and aerodynamically controlling the rocket when the rocket is flying in the second orientation includes aerodynamically controlling the rocket during descent.

12. A method of operating a rocket have a forward end portion and one or more rocket engines positioned toward an aft end portion, the method comprising:
   igniting the one or more rocket engines to launch the rocket from Earth in a first orientation in which the forward end portion leads the aft end portion;
   aerodynamically controlling the rocket during ascent through Earth's atmosphere in the first orientation by moving a bidirectional control surface;

reorienting the rocket from the first orientation to a second orientation in which the aft end portion leads the forward end portion; and aerodynamically controlling the rocket during descent through the Earth's atmosphere in the second orientation by moving the bidirectional control surface.

13. The method of claim 12 wherein moving a bidirectional control surface includes pivoting a control fin that extends outwardly from the aft end portion of the rocket.

14. A rocket for transporting at least one of humans and cargo into space, the rocket comprising:
 a first end portion;
 a second end portion;
 one or more engine exhaust nozzles positioned toward the second end portion; and
 a plurality of bidirectional control surfaces, wherein each of the bidirectional control surface includes:
  a root portion;
  a distal tip portion spaced apart from the root portion;
  a first edge portion extending between the root portion and the tip portion; and
  a second edge portion extending between the root portion and the tip portion, wherein the first edge portion leads the second edge portion when the rocket is flying in a first orientation in which the first end portion leads the second end portion, and wherein the second edge portion leads the first edge portion when the rocket is flying in a second orientation in which the second end portion leads the first end portion;

wherein the first edge portions of the bidirectional control surfaces face generally away from the second end portion and the second edge portions of the bidirectional control surfaces face generally away from the first end portion, wherein each of the bidirectional control surfaces is configured to rotate back and forth about a corresponding pivot axis, and wherein the pivot axis is positioned between a midpoint of the root and the first edge portion.

\* \* \* \* \*